(12) United States Patent
Kannar

(10) Patent No.: US 11,339,449 B2
(45) Date of Patent: May 24, 2022

(54) PROCESS FOR SUGAR PRODUCTION

(71) Applicant: NUTRITION SCIENCE DESIGN PTE. LTD, Bedok Gardens (SG)

(72) Inventor: David Kannar, Mount Eliza (AU)

(73) Assignee: Nutrition Science Design PTE. LTD, Singapore (SG)

(*) Notice: Subject to any disclaimer, the term of this patent is extended or adjusted under 35 U.S.C. 154(b) by 384 days.

(21) Appl. No.: 16/320,625

(22) PCT Filed: Jul. 27, 2017

(86) PCT No.: PCT/AU2017/050781
§ 371 (c)(1),
(2) Date: Jan. 25, 2019

(87) PCT Pub. No.: WO2018/018089
PCT Pub. Date: Feb. 1, 2018

(65) Prior Publication Data
US 2020/0181721 A1    Jun. 11, 2020

(30) Foreign Application Priority Data

Jul. 27, 2016    (AU) ................................ 2016902957
Jul. 27, 2016    (AU) .......................... AU2016902955

(51) Int. Cl.
*C13B 30/10*    (2011.01)
*C13B 30/06*    (2011.01)
*G01N 21/359*    (2014.01)

(52) U.S. Cl.
CPC .............. *C13B 30/10* (2013.01); *C13B 30/06* (2013.01); *G01N 21/359* (2013.01)

(58) Field of Classification Search
None
See application file for complete search history.

(56) References Cited

U.S. PATENT DOCUMENTS

| 6,630,672 B1 | 10/2003 | Brotherton et al. |
| 2003/0170362 A1 | 9/2003 | Manning et al. |

(Continued)

FOREIGN PATENT DOCUMENTS

| AU | 2014201618 | 4/2014 |
| CN | 102505048 | 6/2012 |

(Continued)

OTHER PUBLICATIONS

Salgo et al, application of near infrared spectroscopy in the sugar industry, Near infrared Spectrose., A101-106, 6 (Year: 1998).*

(Continued)

*Primary Examiner* — Stefanie J Cohen
(74) *Attorney, Agent, or Firm* — McDonnell Boehnen Hulbert & Berghoff LLP

(57) ABSTRACT

The application relates to methods and systems for producing a sugar product. The method includes: receiving a first input in a control system representative of a pre-treatment sugar composition characteristic; receiving a second input in the control system representative of a post-treatment sugar product target specification; using the control system to determine at least one operating parameter for a centrifuge and operating the centrifuge in accordance with the at least one determined operating parameter, wherein the at least one determined operating parameter is determined from at least: the first input, the second input, and a correlation relating at least the first input and the second input to the at least one operating parameter; and treating the pre-treatment sugar composition in the centrifuge to produce a post-treatment sugar product with a characteristic that is at or nearer to the target specification than the characteristic of the pre-treatment sugar composition.

10 Claims, 12 Drawing Sheets

(56) References Cited

U.S. PATENT DOCUMENTS

| | | |
|---|---|---|
| 2004/0208981 A1 | 10/2004 | Wong |
| 2005/0175674 A1 | 8/2005 | Lang et al. |
| 2005/0214419 A1 | 9/2005 | Aberle et al. |
| 2008/0014331 A1 | 1/2008 | Babalov |
| 2009/0280231 A1 | 11/2009 | Perlman |
| 2010/0285186 A1* | 11/2010 | Kannar .................. C13B 10/02 426/231 |
| 2012/0115941 A1 | 5/2012 | Payn et al. |
| 2013/0203867 A1 | 8/2013 | Tezuka et al. |
| 2014/0315993 A1 | 10/2014 | Kannar et al. |
| 2014/0357583 A1 | 12/2014 | Ilag et al. |
| 2015/0064328 A1 | 3/2015 | Salemme et al. |
| 2015/0247794 A1 | 9/2015 | Olesberg et al. |
| 2015/0290662 A1* | 10/2015 | Lehnberger ............. B04B 11/04 494/2 |
| 2016/0213039 A1 | 7/2016 | Kumar |

FOREIGN PATENT DOCUMENTS

| | | |
|---|---|---|
| DE | 20 2012 008 678 U1 | 8/2013 |
| GB | 930144 | 7/1963 |
| GB | 2085026 | 4/1982 |
| GB | 2 404 561 | 9/2005 |
| JP | S 59173099 A | 9/1984 |
| WO | 1982/000662 | 3/1982 |
| WO | 1999034193 | 7/1999 |
| WO | 2004/014159 | 2/2004 |
| WO | 2005/117608 | 12/2005 |
| WO | 2007/061795 | 5/2007 |
| WO | 2008/034180 | 3/2008 |
| WO | 2009/043100 A1 | 9/2009 |
| WO | 2010/094837 | 8/2010 |
| WO | 2012/106761 | 8/2012 |
| WO | 2014032100 | 3/2014 |
| WO | 2015/021512 | 2/2015 |
| WO | 2017093302 | 6/2017 |
| WO | 2018/009149 | 1/2018 |
| WO | 2018/018089 | 2/2018 |
| WO | 2018018090 | 2/2018 |
| WO | 2018/138666 | 8/2018 |

OTHER PUBLICATIONS

The International Search Report (ISR) for PCT/AU2017/050781 dated Aug. 9, 2017, pp. 1-5.
The Written Opinion of the International Searching Authority for PCT/AU2017/050781 dated Aug. 9, 2017, pp. 1-4.
The International Preliminary Report on Patentability with amended sheets for PCT/AU2017/050781 dated Nov. 27, 2018, pp. 1-25.
PCT/AU2017/050781—Third Party Observation—WO2009043100 dated May 25, 2018, p. 1.
PCT/AU2017/050781—Third Party Observation—O'Shea et al. dated Nov. 21, 2018, pp. 1-2.
PCT/AU2017/050781—Third Party Observation—Form (O'Shea) dated Nov. 21, 2018, p. 1.
PCT/AU2017/050781—Third Party Observation—Form dated May 25, 2016, pp. 1-4.
Clarke, Margaret A. et al. "Non-Starch, Soluble Polysaccharides of Sugar Cane" Proceeding of the South African Sugar Technologists' Association (1986) pp. 58-61.
Horizon Science "Logicane Low GI sugar Product Specification" (Dec. 2008) pp. 1-3.
Written Opinion of the International Searching Authority for PCT/AU2017/050782 dated Aug. 22, 2017, pp. 1-5.
International Preliminary Report on Patentability (IPRP) for PCT/AU2017/050782 dated May 25, 2018, pp. 1-11.
International Search Report (ISR) for PCT/AU2017/050782 dated Aug. 22, 2017, pp. 1-7.
IPI Bulletin No. 21 "Fertilizing for high yield and quality Sugarcane" International Potash Institute (2013), pp. 1-118.
Jaffe, Walter R. "Health Effects of Non-Centrifugal Sugar (Ncs): A Review" Sugar Tech (2012) vol. 14(2), pp. 87-94.
Jansen, Terry M. "Raw sugar quality form a refiner's perspective" Proc Aust Soc Sugar Cane Technol (2009) vol. 31, pp. 512.520.
Joint FAO Who Report "Carbohydrates in human nutrition" FAO Food and Nutrition. Paper 66 (1999), pp. 6-10.
Kim, Dae-Ok et al. "Quantification of Polyphenolics and Their Antioxidant Capacity in Fresh Plums" Journal of Agricultural and Food Chemistry (2003) vol. 51, pp. 6509-6515.
Nielsen, Paper presented at the Xth Symposium of the Association Andrew Van Hook in Mar. 2003 on Measurement and Automatic Control in Sugar Factories On-line Continuous Measurement of Colour in Sugar Factories.
Nielsen, SPRI 2004 Conference on Sugar Processing Research, Real Time Solution Colour of Crystalline Sugar.
Wolever TMS et al. (2013) European Journal of Clinical Nutrition 57, 475-482.
Cai Ya, Simon H. Gaffney, Terence H. Liley and Edwin Haslam "Carbohydrate—Polyphenol complexation", pp. 307-322, in Chemistry and Significance of Condensed Tannins, Hemingway and Karchesy, Eds. (Plenum Press, 1989).

* cited by examiner

PROCESS FOR SUGAR PRODUCTION

CROSS-REFERENCE TO RELATED APPLICATIONS

This application is a U.S. national phase of International Application No. PCT/AU2017/050781, filed Jul. 27, 2017, which claims priority from Australian application no. AU 2016902955, filed Jul. 27, 2016, and Australian application no. AU 2016902957, filed Jul. 27, 2016, the disclosures of each of which are hereby incorporated by reference in their entirety.

FIELD OF THE INVENTION

The invention relates to an improved method of producing a sugar product.

BACKGROUND OF THE INVENTION

Sugar is presented in many different forms from unrefined panela to refined white sugar. Refining to a 99.9 wt % white sugar effectively removes all vitamins, minerals and phytochemical compounds leaving a "hollow nutrient". Retention of vitamins, minerals and phytochemicals in sugar has been demonstrated to improve health and lower glycaemic index (GI).

Food grade raw and brown sugars can be produced by spraying molasses back on to white refined or other food grade sugar, but this increases reducing sugar content making the product hygroscopic, and more expensive than white refined sugar.

Food companies would use raw sugar if a means could be found to address at least one of the following objectives: consistent quality, lower cost, imparting no significant negative taste or flavour.

It is an object of the invention to address at least one of the aforementioned problems of the prior art.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect of the invention, there is provided a method for producing a sugar product including:
receiving a first input in a control system representative of a pre-treatment sugar composition characteristic;
receiving a second input in the control system representative of a post-treatment sugar product target specification;
using the control system to determine at least one operating parameter for a centrifuge and operating the centrifuge in accordance with the at least one determined operating parameter, wherein the at least one determined operating parameter is determined from at least:
  the first input,
  the second input, and
  a correlation relating at least the first input and the second input to the at least one operating parameter; and
treating the pre-treatment sugar composition in the centrifuge to produce a post-treatment sugar product with a characteristic that is at or nearer to the target specification than the characteristic of the pre-treatment sugar composition.

The term pre-treatment sugar composition, as used herein, is intended to define a sugar composition prior to treatment of that sugar composition in the centrifuge. Similarly, the term post-treatment sugar product refers to the sugar product that is arrived at after treatment of the pre-treatment sugar composition in the centrifuge. A range of different pre-treatment sugar compositions can be treated according to the above method. The pre-treatment sugar composition can be a panela-like crystalline sugar, massecuite, refined sugar, an unrefined sugar, or a raw sugar, or the like. The post-treatment sugar product can be a brown sugar product, a raw sugar product, a white sugar product, a low GI sugar product, or some other form of refined sugar product. Preferably, the post-treatment sugar product is of food grade quality. Thus, in certain forms, the invention advantageously provides a process for producing a sugar product that requires fewer processing steps or unit processes than traditional sugar processes.

An input representative of a sugar composition characteristic can be received from a variety of sources; e.g. it can be received from one or more sensors, It can be received by data transfer from another system e.g. a remote system storing or processing operational data such as specification, sensor data or the like, it may be entered into the control system or by a user via a user interface or input device associated with the control system. A combination of sources may be used in a single embodiment.

In one or more embodiments, the method advantageously allows the production of a post-treatment sugar product with characteristics that are closer to the target specification than the pre-treatment sugar composition. This is achieved, in part, through the use of a database that includes historical information regarding characterisation of previously processed pre-treatment sugar compositions to post-treatment sugar products, and the manner of processing. Information regarding characterisation of the pre-treatment sugar composition and a target specification of the post-treatment sugar composition is fed to the control system; the control system considers this information in combination with the historical information to determine an appropriate operating strategy for the centrifuge to produce a sugar product that ideally has the target specification. Thus, in a preferred form, the correlation is derived from a database of historical first inputs and corresponding historical output characterisation data and associated operating parameter(s).

It will be appreciated, that due to the wide possible variances in the nature of the pre-treatment sugar compositions, there can be some degree of deviation in the post-processed sugar product characteristics from the targeted specification. To this end, in an embodiment, after the step of subjecting the pre-treatment sugar composition to the centrifuge treatment process, the process further includes obtaining corresponding output characterisation data from the post-processed sugar product, and updating the database with the first input, the corresponding output characterisation data, and the operating parameter(s) used in processing. In this way, the control system is a closed loop control system that is able to apply heuristics to improve future process control and narrow the variance in the post-treatment sugar products from the target specification.

It will be appreciated that the characteristic or specifications may be defined in terms of any measurable physicochemical property of the sugar. For example, the property may be viscosity; hygroscopicity; moisture levels; types and concentrations of phytochemicals such as tannins, caramels, flavonoids, mono- and/or polyphenols, and reducing sugars; and conductivity. The initial characteristic of the pre-treatment sugar and/or the output characterisation may be obtained by determining an ICUMSA rating, measuring conductivity, or conducting spectral analysis. Similarly, the target specification may be provided as an ICUMSA rating, conductivity value, or spectrum. Generally it is preferred that the target specification is provided in corresponding form to the initial characterisation, for example, if the initial characterisation is measured as a spectrum, then the target specification may also be provided in the form of an spectrum. Notwithstanding this, the target specification could be provided in terms of a different physico-chemical property to the characteristics measured in the pre and/or post processing sugar products and a correlation between the specification domain and characterisation domain used to determine system control parameters. Thus in one or more embodiments, the database includes information regarding sugar compositions and products in the form of an $R^2$ value that correlates two sugar properties. This allows the control system to predict or determine at least one operating parameter for the centrifuge to target one of those sugar properties based on a pre-treatment sugar characteristic that is the other of those two sugar properties. In one example, the pre-treatment sugar composition characteristic is an NIR spectrum, and the target specification is an ICUMSA value. In this example, the database includes a correlation of NIR spectra data with ICUMSA values, and an appropriate operating parameter for the centrifuge is then selected using this correlation.

In another example, the pre-treatment sugar composition characteristic is conductivity or ICUMSA, and the target specification is a further sugar characteristic (which may be any other property). In this example, the database includes a correlation of conductivity or ICUMSA with the sugar characteristic values, and an appropriate operating parameter for the centrifuge is then selected using this correlation. It will also be understood that the post-treatment sugar product characteristic is conductivity or ICUMSA, and the pre-treatment specification is the further sugar characteristic.

In an embodiment, the pre-treatment sugar composition characteristic is a pre-treatment spectrum, and the post-treatment sugar product target specification is a post-treatment spectrum. These spectra are preferably selected from the group consisting of a colour spectrum, a near infrared (NIR) spectrum, and/or a UV-vis spectrum. More preferably, the spectra are NIR spectra, and preferably determined using NIR or microNIR units. The use of NIR spectra (such as from NIR or microNIR units) is particularly useful in instances where the pre-treatment sugar composition has high ICUMSA. Typically, optimal colour/UV-vis measurements are restricted to a range of 3 to 10,000 IU. However, NIR allows accurate measurements to be taken when the ICUMSA is above 10,000 IU, such as is generally the case with massecuite.

It is preferred that each spectrum is indicative of a property selected from the group consisting of: flavonoid types and/or concentrations, phenol types and/or concentrations, polyphenol types and/or concentrations, tannin types and/or concentrations, caramel compound types and/or concentrations, reducing sugar types and/or concentrations, and moisture, pol, grain size, sucrose concentration, reducing sugar concentration, ash content, and grain size. In one form of the invention, the spectra are NIR spectra that are indicative of tricin concentration. The inventor has found that tricin is able to be detected by NIR, and that measurement of tricin provides a better and more direct measurement than broadly measuring polyphenols. Thus, using tricin concentration as the pre-treatment sugar composition characteristic and/or the post-treatment sugar product target specification provides greater control and specificity over the method resulting in a sugar product with a profile that more closely matches the target specification.

In an embodiment, the target specification is about 0 to about 0.5 g/100 g reducing sugars. More preferably, the target specification is about 0.05 g/100 g to about 0.25 g reducing sugars. Most preferably, the target specification is about 0.12 g/100 g to about 0.16 g reducing sugars.

In an embodiment, the target specification is about 15 mg/100 g to about 45 mg/100 g total polyphenols. More preferably, the target specification is about 20 mg/100 g to about 40 mg/100 g total polyphenols. Most preferably, the target specification is about 25 mg/100 g to about 35 mg/100 g total polyphenols.

In an embodiment, the target specification is a moisture content of 0.02% to 0.6%. Preferably, the moisture content is 0.10 to 0.20%. Most preferably, the moisture content is 0.13 to 0.17%.

In an embodiment, the target specification is a glucose based glycaemic index of less than 55.

In an embodiment, the target specification is a colour of about 500 to 2000 ICUMSA. More preferably, the target specification is a colour of about 800 to 1800 ICUMSA. Most preferably, the target specification is a colour of about 1150 to 1450 ICUMSA.

In an embodiment, the target is an electrical conductivity of 100 to 300 µS/cm.

In an embodiment, the characteristic of the post-treatment sugar product is within 20% of the target specification. Preferably the characteristic is within 18% of the target specification. More preferably, the characteristic is within 15% of the target specification. Even more preferably, the characteristic is within 12% of the target specification. Still more preferably, the characteristic is within 10% of the target specification. Most preferably, the characteristic is within 5% of the target specification.

As generally discussed above, the control system determines an operating strategy with a view to producing a post-treatment sugar product that has a profile that is consistent with (or approaches) the target specification. While the operating strategy can be in respect of any parameter associated with operation of the centrifuge, it is preferred that the operating strategy controls one or more parameters selected from the group consisting of: wash time, volume of wash solution, centrifuge g-force (which can be achieved by selecting a centrifuge speed), wash nozzle shape, angle, position and temperature, one or more centrifugal feed parameters e.g. batch size (i.e. volume of sugar product being washed), feed rate. Preferred parameters include centrifugal wash time, and volume of wash solution. In some cases, e.g. the case that a centrifugal feed parameter is controlled, it should be noted that such control may be applied to a device different to the centrifuge such that the parameter associated with the operation of the centrifuge is controlled, e.g. a valve upstream of the centrifuge can be controlled to determine feed rate or batch size.

Controlling the process in this manner provides a number of advantages over known sugar production methods. In one example, the method may be used to prepare a low glycaemic index (GI) sugar. Low GI sugars generally include an amount of natural phytochemicals. In prior art processes, these phytochemicals are typically washed out of a pre-treatment sugar composition to produce a white sugar. The reason for this is to achieve consistency and uniformity for organoleptic purposes in food, and also to remove impurities such as herbicide residues, and pesticide residues. Furthermore, in some prior art processes colour, polyphenols, phytochemical complexes are also considered impurities and are thus desirably removed. The white sugar is then subsequently treated with molasses or sugarcane extract to coat the white sugar with the phytochemicals and thus produce a low GI white sugar coated in phytochemicals.

In contrast with this, some embodiments of the present method are able to directly produce a low GI sugar product through control of the centrifuge without processing the sugar through to refined white sugar and then respraying molasses onto the refined white sugar to form the low GI sugar. However, while this is an advantage of these embodiments, the invention should not be limited to excluding this feature. Other forms of the invention contemplate subsequent respraying of extracts (such as molasses) back onto the resultant sugar.

In another example, the method may be used to prepare raw or brown sugars without respraying of molasses onto refined white sugar. More generally such a method may allow sugar refineries and/or mills to produce a more consistent product. As an alternative or additionally, such methods may reduce the cost of production in terms of either or both of operating costs (by reducing washing time and or water usage) and capital costs (by reducing the need for equipment to perform re-spraying or other post-washing steps). The heuristics allow the control system to refine the operating parameter(s) of the centrifuge to accommodate and adapt to a wide range of pre-treatment sugar composition inputs.

In an embodiment, the method further includes providing the first input to the control system representative of the pre-treatment sugar composition characteristic.

In an embodiment, the method further includes providing the second input to the control system representative of the post-treatment sugar product target specification.

In a second aspect of the invention, there is provided a system for producing a sugar product including:
  at least one centrifuge for treating a pre-treatment sugar composition to produce a post-treatment sugar product;
  at least one sensor for determining one or both of a pre-treatment sugar composition characteristic and a post-treatment sugar product characteristic;
  a control system configured to determine at least one operating parameter for the at least one centrifuge based on:
    a pre-treatment sugar composition characteristic,
    a target specification of the post-treatment sugar product, and
    a correlation relating at least the pre-treatment sugar composition characteristic and the target specification to the at least one operating parameter;
  wherein the control system is further configured to operate the at least one centrifuge in accordance with the operating parameter.

In an embodiment, the system further includes a database of historical pre-treatment sugar composition characteristics, corresponding historical post-treatment sugar product characteristics, and corresponding operating parameter(s) from the at least one centrifuge; and wherein the correlation is derived from historical information in the database.

In an embodiment, the at least one sensor is for determining a pre-treatment sugar composition characteristic and a post-treatment sugar product characteristic. Preferably, where the system further includes the database, the at least one sensor is configured to update the database with the pre-treatment sugar composition characteristic, the post-treatment sugar product characteristic, and the operating parameter(s).

In an embodiment, the system includes at least two sensors, a first sensor to determine the pre-treatment sugar composition characteristic, and a second sensor to determine the post-treatment sugar product characteristic. Preferably, the first sensor is located upstream of the centrifuge, such as adjacent an inlet to the centrifuge; and the second sensor is located downstream of the centrifuge, such as adjacent an outlet of the centrifuge or further downstream, such as after the sugar has been dried.

In an embodiment, the centrifuge is a batch centrifuge. In an alternative embodiment, the centrifuge is a continuous centrifuge.

In a further aspect of the invention there is provided a sugar production plant that includes the above mentioned system for producing sugar.

In preferred forms the methods and systems described herein can be used in the production of a sugar product as described in the Australian Provisional Patent Application No. 2016902954 filed on 27 Jul. 2016 with the title "Sugar composition" filed by the same applicant, on the same day as the provisional applications upon which this application claims priority. The entire disclosure of each of these documents is incorporated herein by reference.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
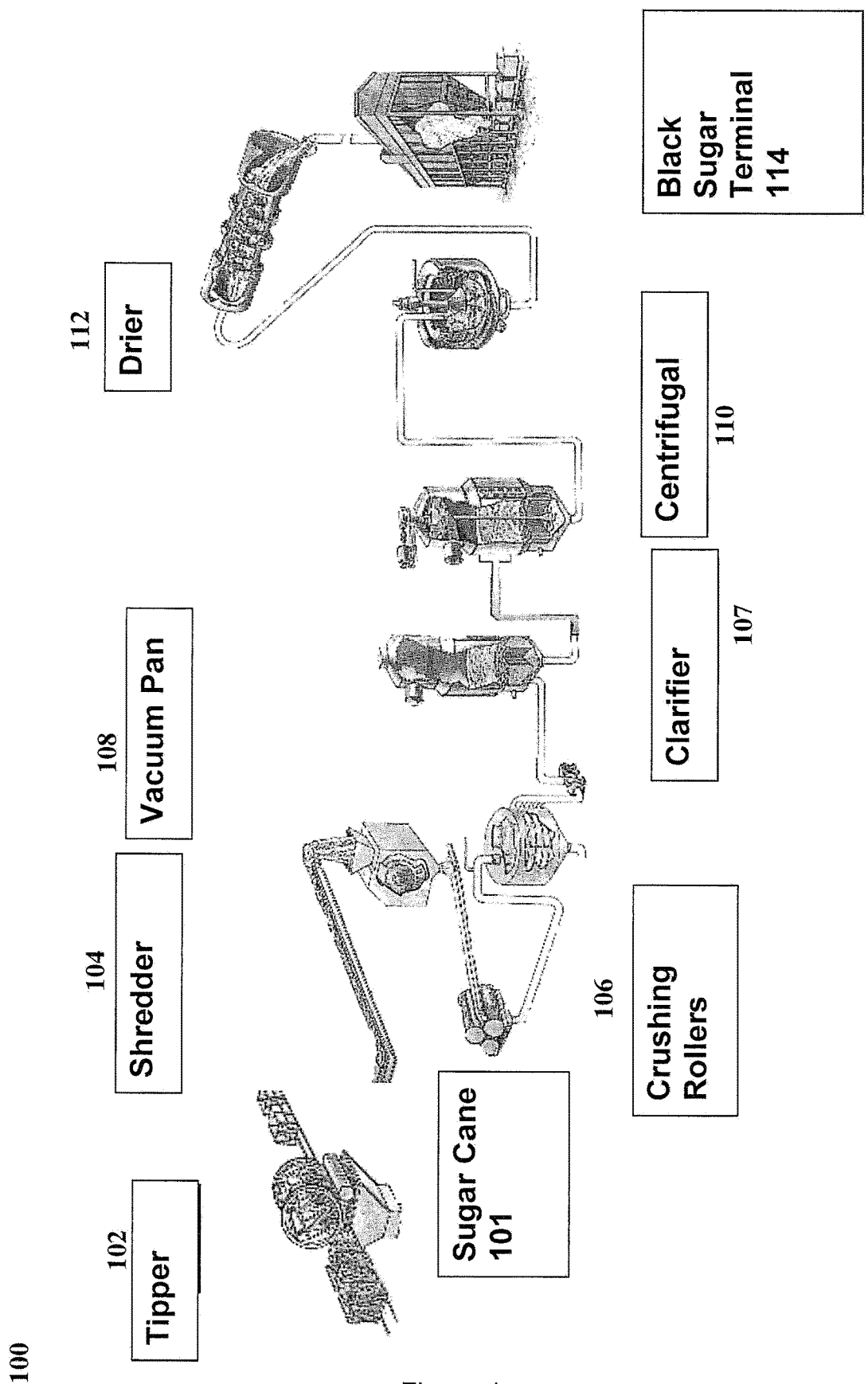
FIG. 1 is a process flow diagram showing a primary mill sugar process of the prior art.

FIG. 1 is a process flow diagram showing a standard primary mill sugar process 100. Briefly, in this process 100, sugar cane 101 passes from a tipper 102 into a shredder 104, before passing through crushing rollers 106. The purpose of this is to extract the sugar containing juice from the sugar cane 101. The sugar containing juice is then further processed such as in a clarifier 107 to removed suspended solids from the juice. The clarified juice is then passed to a vacuum pan 108, where water is evaporated to concentrate the juice into thick syrup including sugar crystals. Sugar crystals are separated from mother liquor using a centrifuge 110 (sometimes colloquially called a "centrifugal" or "fugal" in the field) in a centrifugal washing process. The sugar is then dried in a dryer 112 and stored in a bulk sugar terminal 114 in the form of dark coloured, non-food grade sugar that is about 96-99 wt % sucrose. Further processing of this non-food grade sugar is required to convert the sugar to refined white sugar, which is 99.9 wt % sucrose.

This further processing to form the refined white sugar requires expensive processing steps that typically include: remelting, carbonatation, decolourisation, and filtering. These steps are required to remove the colour components to form a high quality refined white sugar product. Presently, this additional processing typically adds around A$250 per tonne to the value or about 33% of the final finished cost.

Figure 2:
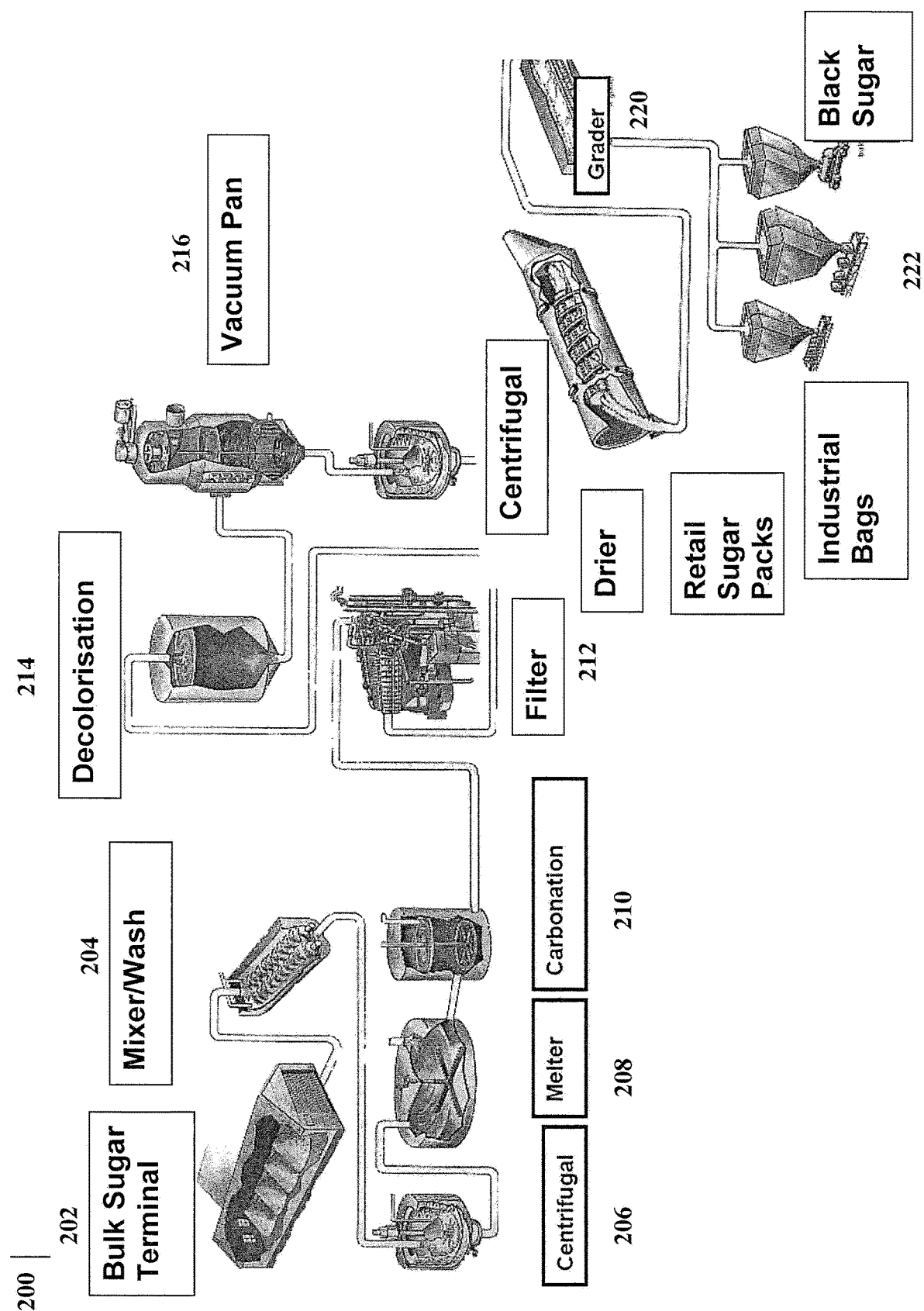
FIG. 2 is a process flow diagram showing a sugar refining process of the prior art.

FIG. 2 is a process flow diagram showing an existing sugar refining process 200. Bulk sugar crystals are transported from a bulk sugar terminal 202 to a mixer/washer 204 where the sugar is mixed with heavy syrup. The purpose of this is to dissolve the outer layers of the sugar crystals which typically include a greater level of impurities than within the crystal. This mixture is then fed into a centrifuge 206, for a centrifugal washing process, to further remove impurities from the washed sugar crystals. In some processes, the sugar is then treated using a melter 208 prior to being fed into a carbonation unit 210 where it undergoes a carbonatation process whereby limewater is introduced into a sugar syrup composition which aids in the precipitation of impurities and their subsequent removal using filtration 212. Once the solids have been removed, the syrup may then be decolourised 214 through filtration through a bed of activated carbon or with ion-exchange resin. The sugar is then dried in a vacuum pan 216 and may be further washed in another centrifuge 218 if required. The dry product is then graded 220 and packaged in industrial bags 222 for shipping.

The above described processes are general methods that are used to produce refined white sugar. Low GI, raw, and brown sugars require additional post-processing steps. Generally, to produce low GI or brown sugars, the refined white sugar is further treated with molasses and/or other extracts or additives to coat the surface of the white sugar crystals. Due to this further processing, these sugars are more expensive to produce than refined white sugars. Thus, some embodiments of the present invention also provides a method of forming brown or raw sugars through optimisation of the centrifugal wash process rather than through further processing refined white sugar with molasses. Due to the absence of the molasses coating, the brown or raw sugar products produced with some embodiments are less hygroscopic, and so can be handled in standard bulk handling equipment and used in industrial food production. This can reduce the cost of production.

The inventor has developed a new process that may enable the manufacture of a consistent sugar product. This sugar product can be tailored for industrial, wholesale, foodservice, and retail use. One of the target sugar products is a raw sugar having a low GI rating. However, it will be appreciated that a range of different sugar products of varying specification may be produced. This sugar production process is typically a lower cost process than traditional processes, and generally results in improved product quality (e.g. more consistent specifications) and can also result in lower energy (which also has the benefit of reducing carbon emissions) and water usage.

In a typical batch centrifugal washing process, the process includes at least the steps of loading the basket of the centrifuge with a pre-treatment sugar composition; spinning the centrifuge and spraying washing the sugar crystals, and unloading the washed post-treatment sugar product from the centrifuge. These general steps are well known to the skilled person. However, the inventor has found that control and optimisation of the process conditions in the centrifugal washing step can provide a higher quality sugar product, or a sugar product that has tailored properties than with traditional processes. These tailored properties include, amongst other things: tailored glycaemic index (GI) profile, for example low GI sugars; tailored flavour profiles, which allows speciality sugars to be produced for a specific purpose (such as an ingredient in a food or beverage item), or tailored physico-chemical properties. Furthermore, the method allows fewer processing steps, and therefore reduces both capital and operating expenses.

During the centrifugal washing step, the centrifuge is ramped up to steady state at a constant rotational speed. The resultant g-force causes the sugar crystals to form a layer over the vertical walls of the centrifuge basket. Wash water is introduced, such as in the form of spray water, which contacts the exposed surface of the sugar crystals and dissolves the outer layer of the sugar crystals which has a higher level of impurities than the within the sugar crystals. The g-force developed within the centrifuge causes the wash water to permeate through the sugar crystal layer and dissolve further surface impurities from the sugar crystals within the layer. At the end of the washing step, the rotational speed of the centrifuge is ramped down from steady state till rotation ceases. The resultant post-treatment sugar product can then be removed.

There are a number of parameters that can be controlled during operation of the centrifuge, and each of these can impact the properties and composition of the post-treatment sugar product. These parameters include: volume of water used for centrifugal washing; duration of centrifugal washing; temperature of wash water; control of water delivery mechanism, duration, and rate; steady state rotational speed of the centrifuge or g-force; rate at which the rotation speed of the centrifuge is ramped up or down; duration of ramping the speed of the centrifuge up, down, and operating at steady state.

Although control of the centrifuge has a significant impact on the quality of the post-treatment sugar product, to date, this control has typically been in the form of a rudimentary manual feedback type system. This feedback system generally involves checking the quality of the post-treatment sugar product, and if the quality is below a set point value, manually adjusting some aspect of the centrifugal washing process (typically increasing or decreasing the wash cycle duration) to improve product quality. This form of control is very coarse and substantially relies on the experience of an operator to make the correct manual adjustment. Given the coarse nature of the control, speciality sugars with tightly defined specifications cannot be consistently produced.

This form of control also results in a process which is highly inefficient in comparison to an automated system and cannot monitor specific components such as certain flavonoids or caramels etc. required for some less refined sugars. This control strategy fails to consider the nature of the incoming pre-treatment sugar composition and the relevance of this to the centrifugal treatment step. Consequently, such coarse control often requires the post-treatment product to undergo further processing, or results in loss of product. For example, if there is significant variance in quality between batches of the pre-treatment sugar composition fed into the centrifuge, but the same operating conditions are applied this can cause (i) low quality batches to be under-treated and thus require a further treatment step, or (ii) high quality batches to be over-treated in which case there is significant loss of sucrose from the sugar crystals due to excessive washing. That is, the volume of water used for washing depends on the quality of the pre-treatment sugar composition in terms of viscosity, crystal size distribution, and other physico-chemical properties. Furthermore, for a given water volume, the quality of the post-treatment sugar product can vary depending on the stage within the washing cycle.

Given the above, the inventor has found that by assessing the quality of the pre-treatment sugar composition it is possible to determine a wash strategy in the form of a set of centrifuge operating parameters to provide a post-treatment sugar product having desired characteristics. Thus, in certain forms, extracts or additives are not required to produce a raw or brown sugar product. These products can instead be made by measuring various parameters in pre-treatment sugar compositions (such as massecuite) and the post-treatment sugar product (which may be a raw sugar). This closed loop system enables tighter control of washing which significantly reduces variability of raw product, so a consistent specification can be achieved. Importantly when used to produce a raw sugar (or any sugar that is conventionally produced by spraying molasses or other extracts back on to processed sugar), this system reduces the level of reducing sugars in the final product and produces a more consistent sugar product.

As above, these characteristics may be in the form of a specific GI, colour, or flavour profile. By way of example, a specialty sugar having a particular GI profile, colour, and flavour profile may be desired. To produce this product, an analytical process such as NIR may be used to derive a spectrum that is indicative of phenol or flavonoid types and concentrations in the pre-treatment sugar composition. In another example, phytochemicals are directly (or indirectly) standardized from a pre-treatment sugar composition (such as massecuite) to the post-treatment sugar product. In each case, appropriate process operating parameters for the centrifuge can then be adopted to produce the specialty product. These process operating parameter(s) can be determined by assessing the input characteristics and the desired output characteristics in conjunction with a database that includes historical production data (e.g. input characteristics with corresponding output characteristics and the centrifuge operating parameter(s)). Thus, the system is in effect a feed forward control system which assesses an input quality and determines process operating parameter(s) for the centrifuge are based, in part, on historical empirically derived data. By further including some form of analysis downstream, such as a further NIR spectrometer, the quality of the post-treatment product can be evaluated. The database may then be updated with the input, output, and centrifuge process operating parameter(s) from this iteration.

The correlation of input characteristics, output characteristics and processing parameters in the database is particularly advantageous during the processing of the early batches of a bulk load of pre-treatment sugar product. As will be appreciated each bulk load of pre-treatment sugar product will be different to the last. In prior art systems the centrifuge parameters used of the first batch of a new bulk load are based purely on operator skill or some standard operating procedure. However in embodiments of the present invention the measured input characteristic(s) of the first batch can be used to choose more reliable operating parameters, which can be refined over time with subsequent batches.

Given the above, one element of this technology is the use of a new closed loop NIR sugar analysis system that incorporates a control algorithm. In a preferred embodiment the method uses a heuristic algorithm to produce a sugar product of desired composition. The algorithm is able to determine and implement an operating strategy for treatment of a sugar composition in a centrifuge based on the composition of the sugar composition fed into the centrifuge and the desired or target composition of the sugar product after treatment in the centrifuge. The operating strategy will include at least one operating parameter for the centrifuge and is determined from a database that includes historical information regarding input compositions, corresponding output compositions, and the corresponding process conditions. By continuing to measure and record respective inputs, outputs, and process conditions, the database that the algorithm draws upon is expanded with additional data which further increases the reliability of the process control system.

Figure 3:
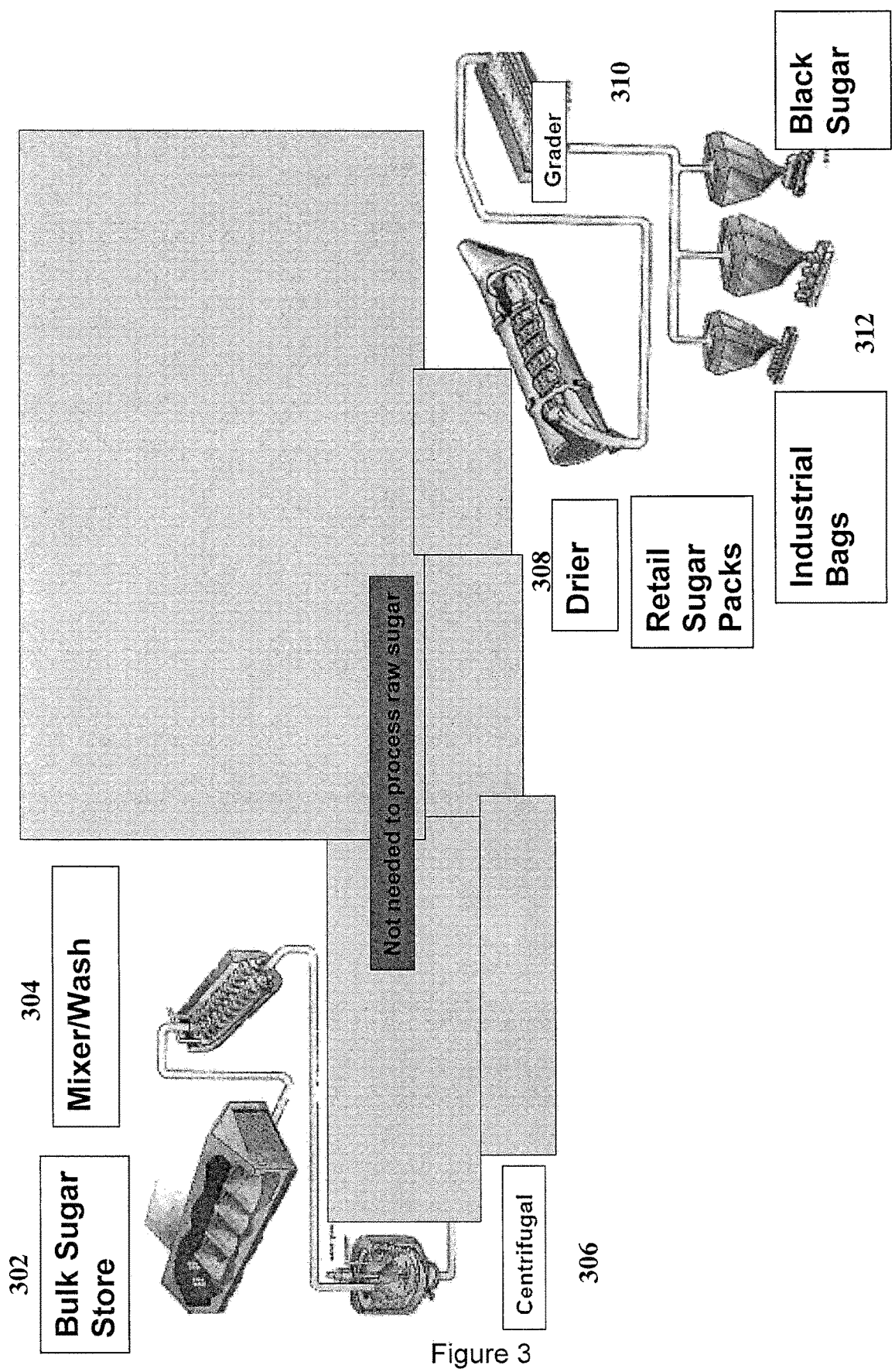
FIG. 3 is a process flow diagram showing a smaller purpose built sugar refining plant according to the present invention.

As discussed above, one advantage of this increased level of process control is that fewer processing steps are required to produce a sugar product. FIG. 3 is a process flow diagram of one embodiment of a purpose built plant for processing raw sugar that includes the above discussed process control system. As can be seen, in this process, bulk sugar crystals are transported from a bulk sugar terminal 302 to a mixer/washer 304 where the sugar is mixed with heavy syrup; this is then fed into a centrifuge 306 for treatment of the sugar crystals. Once treatment in the centrifuge 306 is completed, the sugar crystals are separated from the liquor and fed to a dryer 308, where the crystals are dried. The sugar crystals are then graded 310 and packaged 312 for shipping.

Sensors may be included at various stages throughout the process to affect the desired control.

In one example, the system may include at least two sensors, a first sensor located upstream of the centrifuge and a second sensor located downstream of the centrifuge. The first sensor is preferably located adjacent to the inlet to the centrifuge so that it can determine a characteristic of the pre-treatment sugar composition before or as it enters the centrifuge. The second sensor is preferably located adjacent to the outlet of the centrifuge so that it can determine a characteristic of the post-treatment sugar product as it leaves the centrifuge.

Figure 4:
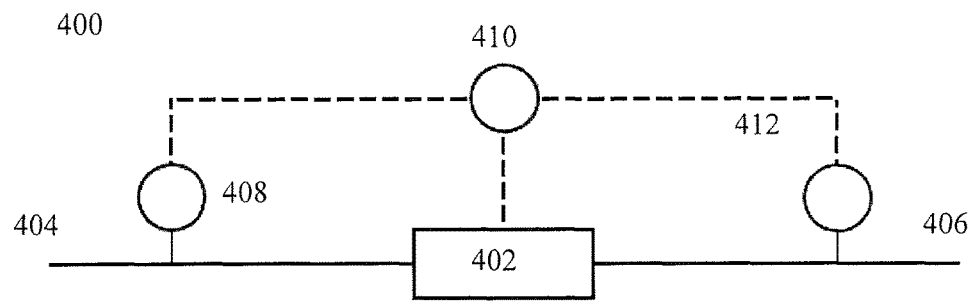
FIGS. 4 to 7 are schematic block diagrams representing a portion of a sugar processing system that can implement an embodiment of the present invention.

FIG. 4 illustrates an embodiment of this example. In FIG. 4, the system 400 includes a centrifuge 402 having a pre-treatment sugar composition feed line 404 and an outlet line 406 for off-take of the post-processed sugar product. The feed line 404 includes a sensor 408 for measuring a characteristic of the pre-treatment sugar composition. As discussed previously, a range of different sensors may be used. However, in this example, the sensor 408 is an NIR spectrometer for detecting the presence of tricin. Data from the sensor 408 is fed to a control system 410, and the control system 410 determines an appropriate operating parameter with which to operate the centrifuge 402 in order to obtain a post-treatment sugar product with desired characteristics or a desired profile. This operating parameter may be empirically determined from a database of stored historical inputs, outputs, and operating parameters; or the operating parameter may be based on an equation that determines an operating parameter from input characterisation data. Such an equation may, for example, be empirically derived from historical data. In any event, the pre-treatment sugar composition is then fed into the centrifuge 402, where it is processed according to the operating parameter, for example wash time, as determined by the control system 410 to obtain the desired characteristics or profile. Once processing in the centrifuge 402 is completed, the post-treatment sugar product passes out of the centrifuge 402. A sensor 412 on the outlet line 406 measures an actual characteristic or profile of the post-treatment sugar product, and relays this information back to the control system 410. The control system 410 can compare the actual characteristics or profile of the post-treatment sugar product against the desired characteristics or profile and optionally perform a number of tasks to improve process control. The control system 410 may update the database with the input, desired output, actual output, and centrifuge operating parameter to provide the system with additional historical data upon which to determine a future operating parameter. Alternatively, or additionally, the control system 410 may alter the form of the equation used to determine the operating parameter; for example, if the sensor 412 on the outlet line 406 determines that the concentration of tricin is too high, then the control system 410 may adjust the equation such that future washing cycles are extended (and/or adjust other operating parameters in an appropriate manner). Alternatively, or additionally, the control system 410 may act to apply a change to the operating parameter in order to improve the output. By way of example, if the sensor 412 on the outlet line 406 determines that the concentration of tricin is too high, then the control system may simply increase the wash time (or alter another operating parameter in the appropriate manner) .e.g. by adding a fixed value to the wash time, (e.g. 0.1 second), by multiplying the previously determined wash time by a predetermined fashion, or other numerical adjustment method.

In the system 400 of FIG. 4, there are no unit processes between the sensor 408 on the inlet line 404 and the centrifuge 402, and similarly no unit processes between the centrifuge 402 and the sensor 412 on the outlet line 406. However, it will be appreciated that in certain embodiments, there may be one or more unit processes performed between sensors 408 or 412 and the centrifuge 402. By way of example, the post-processed sugar product may be subjected to a drying process after treatment in the centrifuge 402, but prior to passing sensor 412.

As noted above the target specification could be expressed in terms of a directly any measurable characteristic of the pre and/or post processed sugar products or an alternatively a physico-chemical property which can be correlated with the measured characteristic. FIGS. 7 to 18 show example data obtained using NIR analysis of sugar samples to illustrate that NIR measurement can be used to perform characterisation of a sugar product (either or both at pre- or post-processing) and this can be used to target a post-treatment sugar product target specification. In these examples, a correlation is demonstrated between NIR measurements and polyphenols, tricin and colour that demonstrates that NIR could be used to directly evaluate product composition in real-time compared to specifications expressed in these parameters. And accordingly that process control could be performed using such NIR measurement techniques.

EXAMPLES

Sample Collection 27 sugar samples were produced by Mill 1 Mill 2. Approximately 100 g of raw sugar was sampled using screw capped plastic bottles from the finished product conveyor. Reference data were obtained by wet chemistry or traditional methods and a correlation of these results with measured NIR spectra was performed.

Reference Data

Polyphenol Analysis 40 g of raw sugar sample was weighed into a 100 ml volumetric flask. Approximately 40 ml of distilled water was added and the solution was agitated until the sugar was fully dissolved before solution was made up to final volume with distilled water. The polyphenol analysis was based on the Folin-Ciocalteu method.

In brief, a 50 µL aliquot of appropriately diluted raw sugar solution was added to a test tube. 650 µL of ultrapure water was added and mixed. 50 µL of Folin-Ciocalteu reagent was added and mixed. After 5 minutes 500 µL of 7% $Na_2CO_3$ solution was added with mixing. After 90 minutes at room temperature the absorbance was read at 750 nm.

The standard curve for total phenolics was prepared using catechin standard solution (0-250 mg/L). Sugar analysis results were expressed as milligrams of catechin equivalent (CE) per 100 g raw sugar.

Colour Analysis

Colour was analysed according to the Sugar Research Australia Standard Analytical Method 33 (2001).

In brief, 20 g of raw sugar was accurately weighed into a 100 ml volumetric flask; approximately 50 ml of distilled water was added and agitated until sugar dissolved. 10 mls of 0.2M MOPS (3-(N-morpholino)propanesulfonic acid) buffer solution (pH 7) was added to flask and the solution made to volume with distilled water. A reference solution was made with the addition of 10 ml MOPS buffer to a 100 ml volumetric flask and made to the mark with distilled water. Each sample solution and reference solution was filtered using 0.8 µm prefilter connected to a 0.45 µm membrane filter (Millipore, Millex HA). Absorbance of the filtered sugar solution was measured at 420 nm using the reference solution as the blank. The ICUMSA colour was calculated.

ICUMSA colour=($A420$/concentration in g/ml)×1,000

Results

Comparison to NIR Readings

NIR analysis was performed with a ProFOSS Direct Light NIR spectrophotometer. The Instrument read head was mounted on a vibration damping arrangement and installed within a mounting enclosure for continual analysis of the moving sugar process stream.

FIGS. 8 to 19 show the calibration parameters of each model and indicate validation performance. Partial least squares (PLS) regression calculates new planes in multivariate space that describe the maximum (residual) variance in the data. These are called factors or principal components. The plot of explained variance (see FIGS. 10, 14 & 18) shows the percentage of the total variation in Y explained by the model with the inclusion of successive factors. The calibration dataset is shown in blue and the validation dataset in red.

Figure 8:
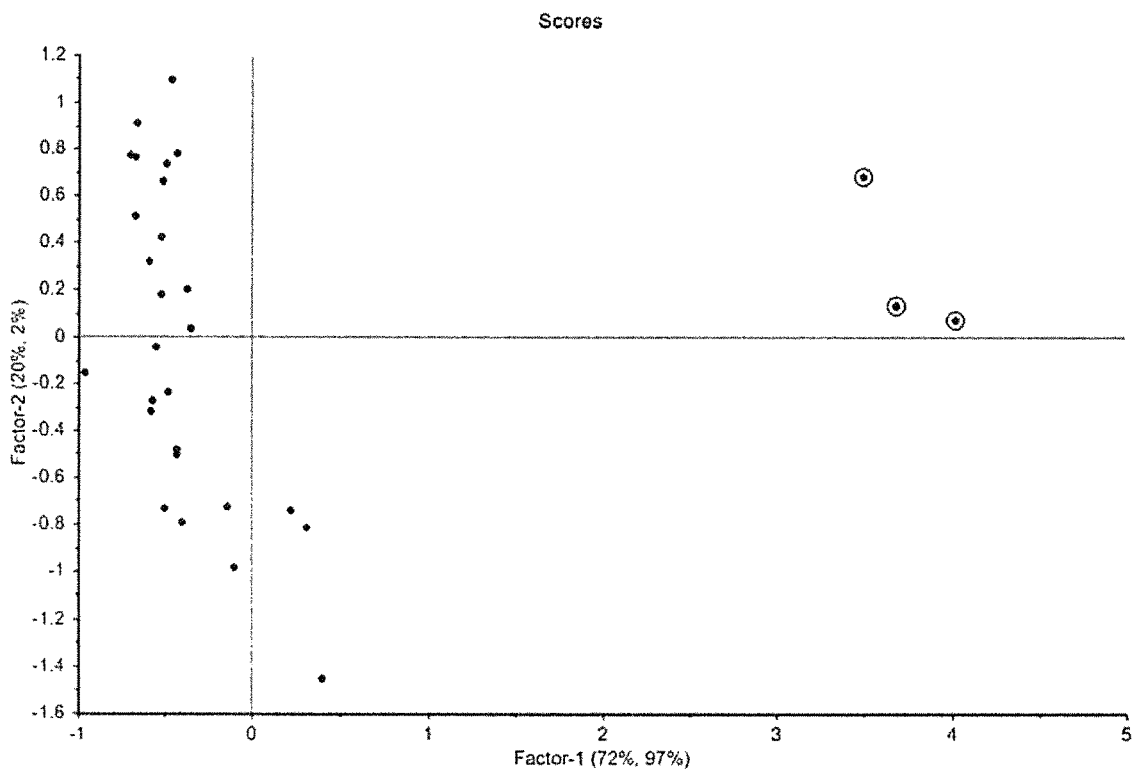
FIG. 8 is a total phenolics calibration score plot indicative of the distribution of the sample population in two dimensions.
Figure 9:
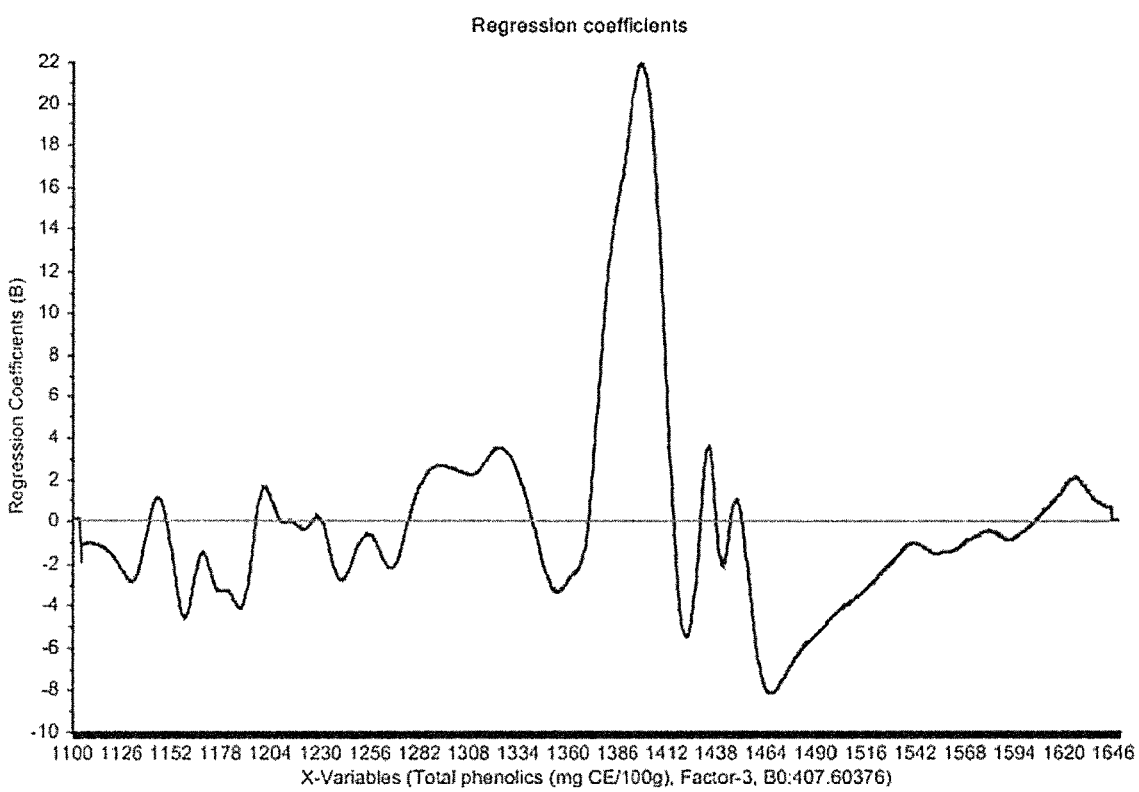
FIG. 9 is a total phenolics calibration regression plot.
Figure 10:
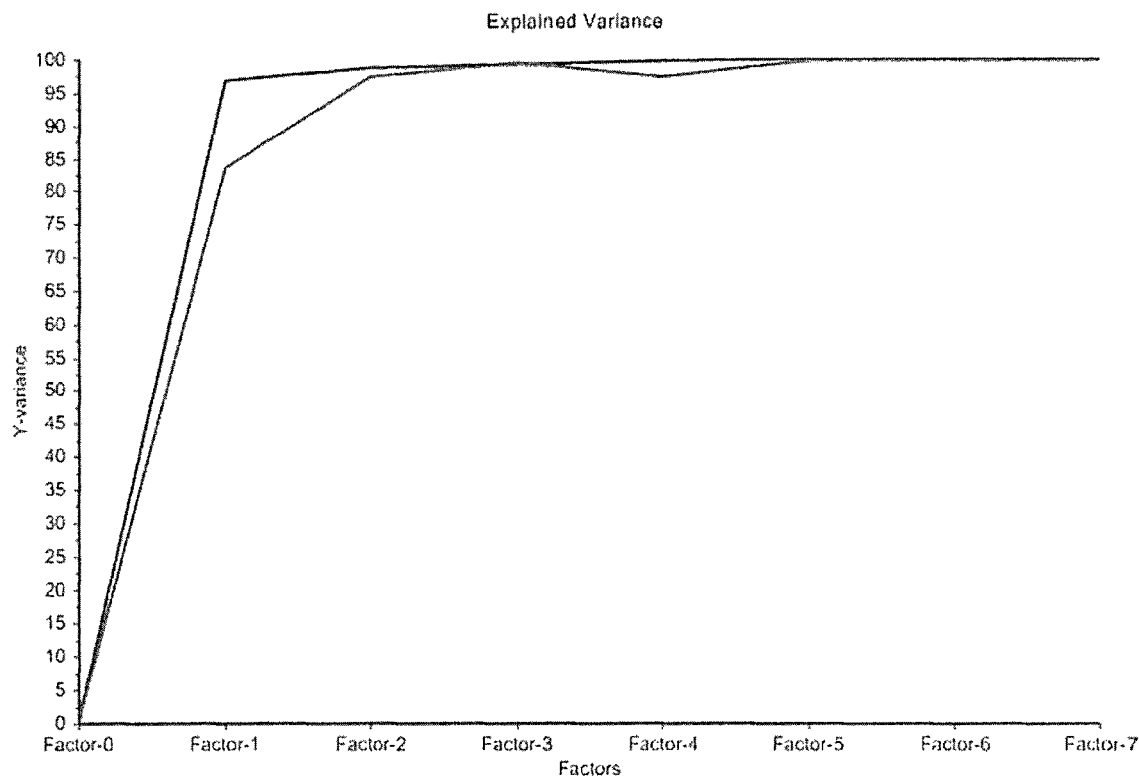
FIG. 10 is a total phenolics calibration plot of explained variance.
Figure 11:
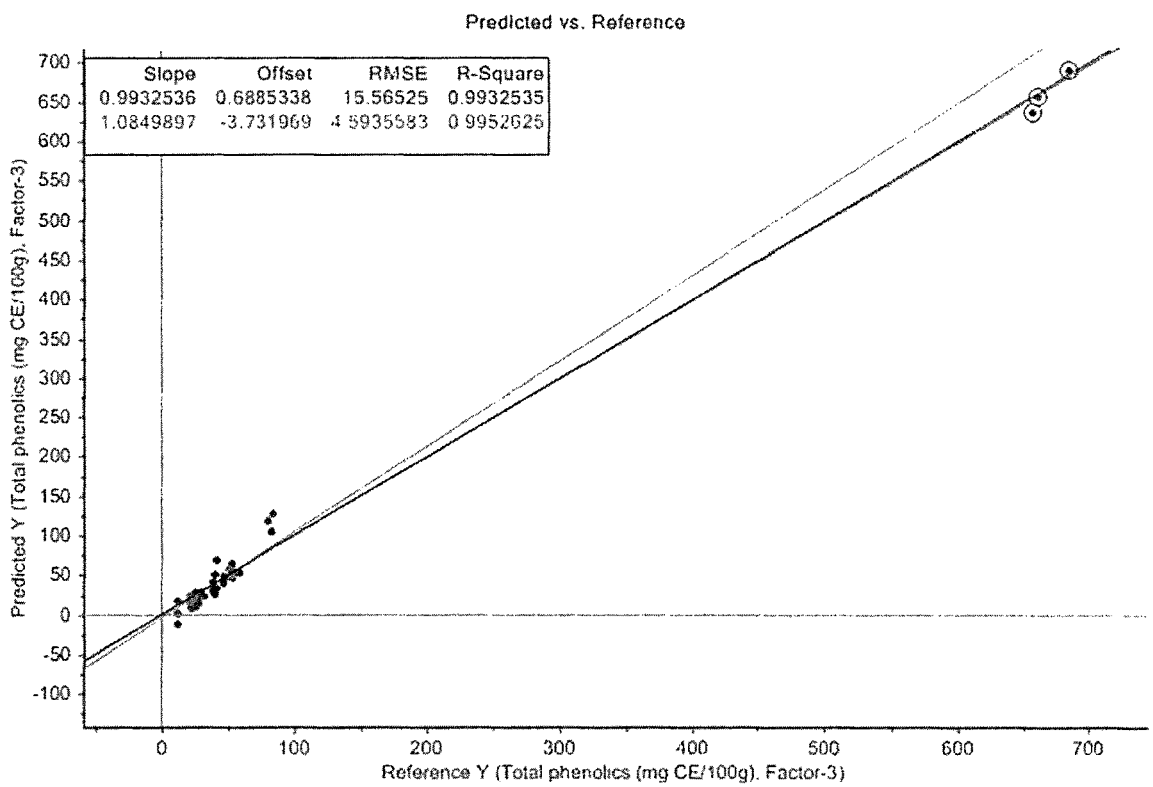
FIG. 11 is a total phenolics calibration predicted vs reference plot showing the relationship between the reference data value and the NIR-predicted value.
Figure 12:
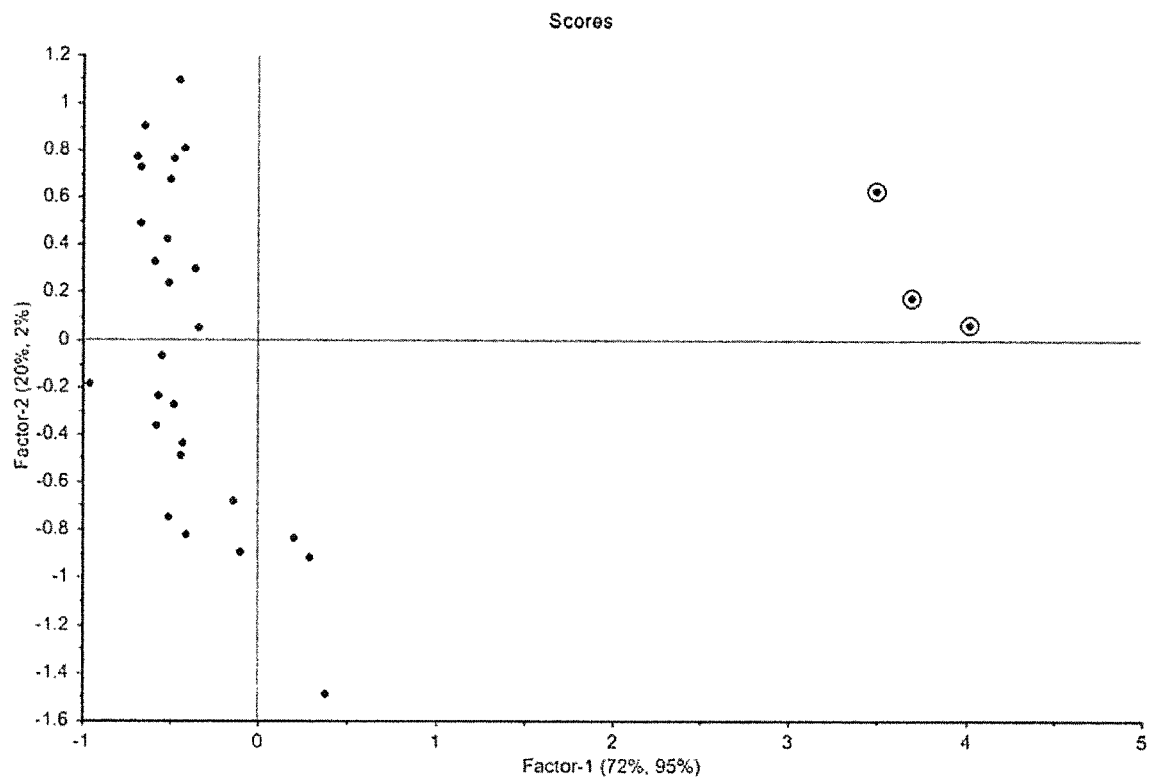
FIG. 12 is a ICUMSA sugar color calibration score plot indicative of the distribution of the sample population in two dimensions.
Figure 13:
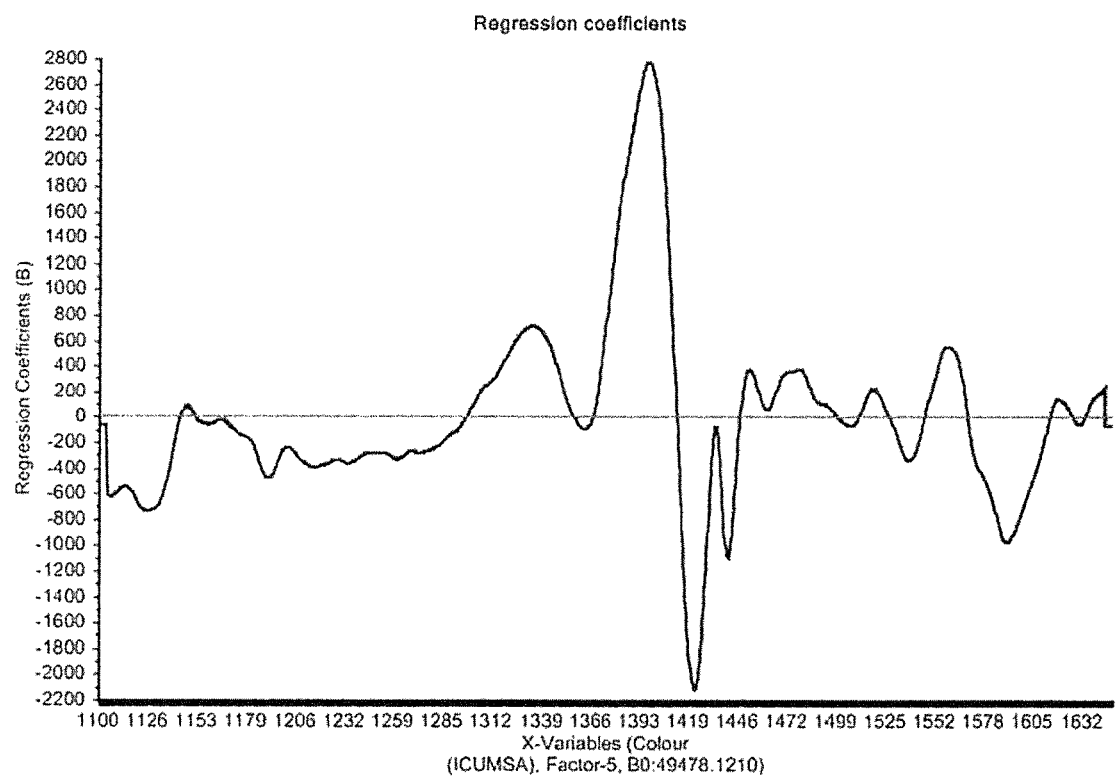
FIG. 13 is a ICUMSA sugar color calibration regression plot.
Figure 14:
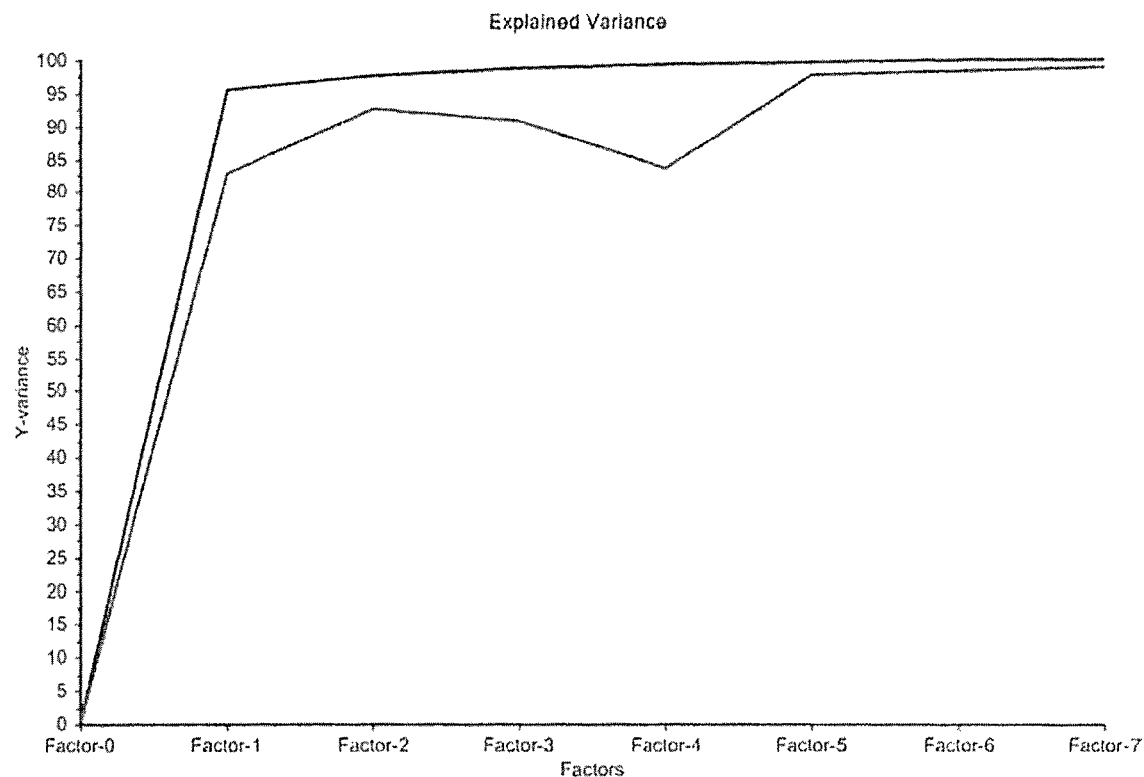
FIG. 14 is a ICUMSA sugar color calibration plot of explained variance.
Figure 15:
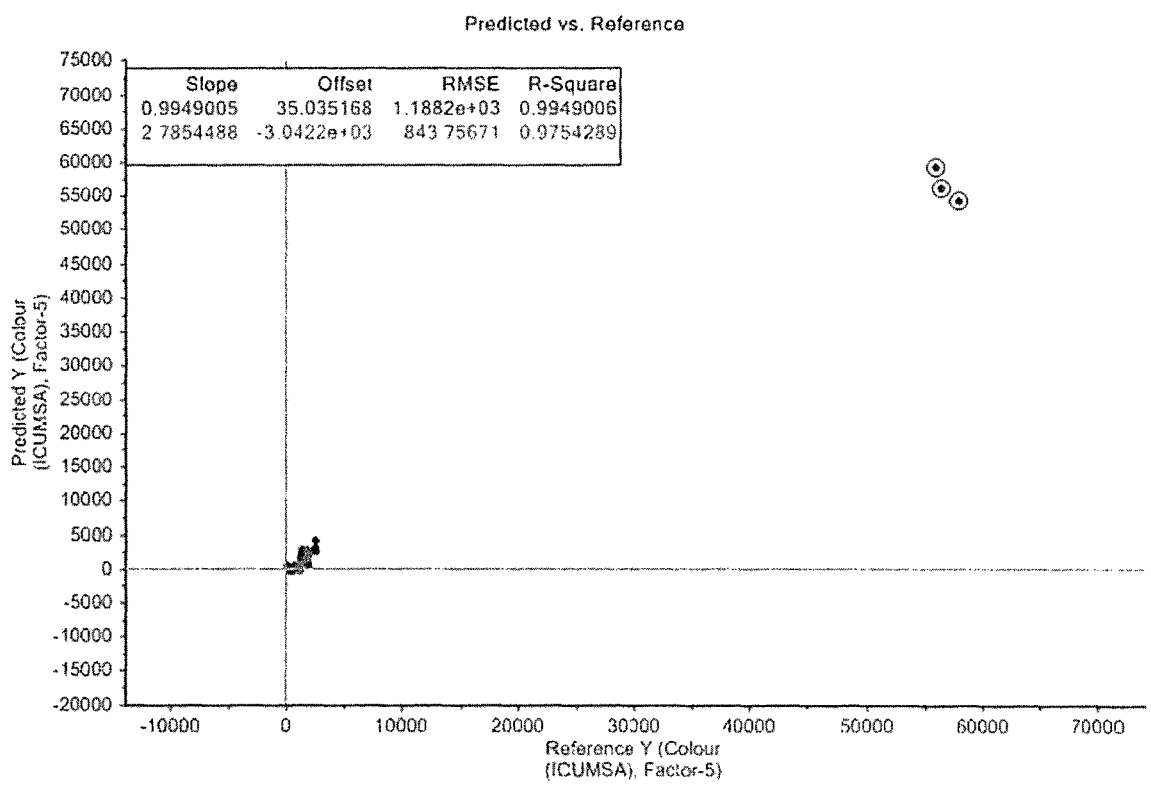
FIG. 15 is a ICUMSA sugar color calibration predicted vs reference plot showing the relationship between the reference data value and the NIR-predicted value.
Figure 16:
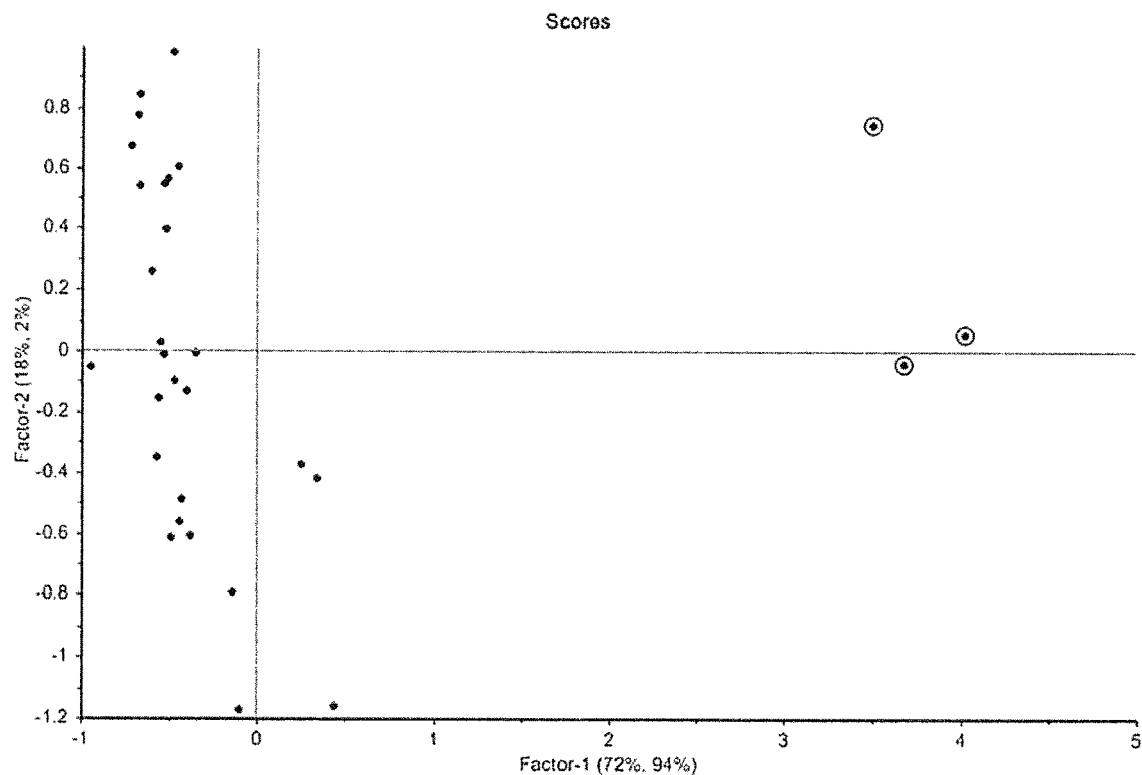
FIG. 16 is a tricin calibration score plot indicative of the distribution of the sample population in two dimensions.
Figure 17:
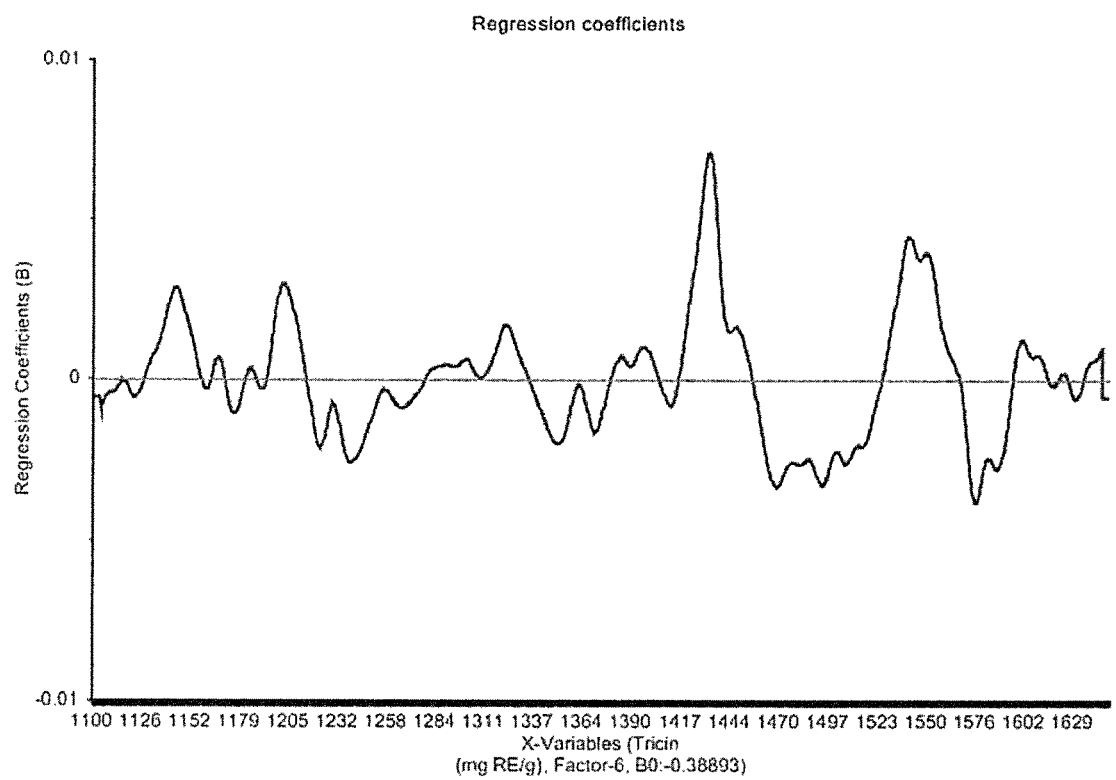
FIG. 17 is a tricin calibration regression plot.
Figure 18:
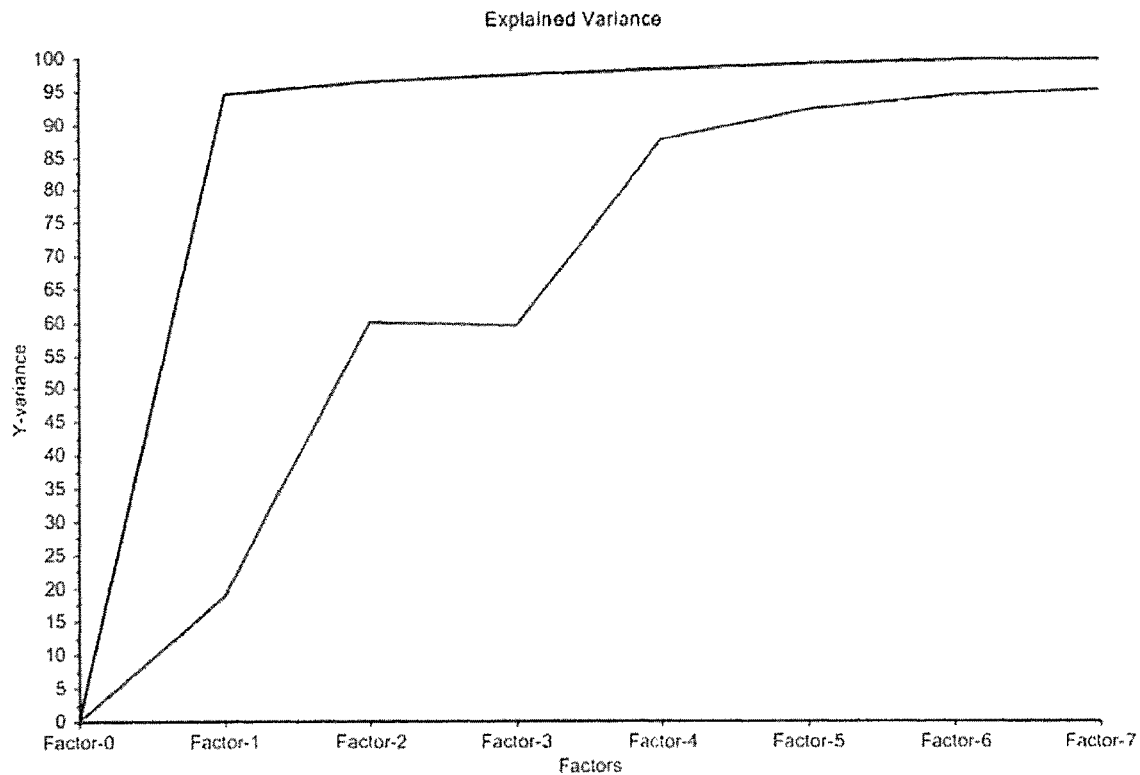
FIG. 18 is a tricin calibration plot of explained variance.
Figure 19:
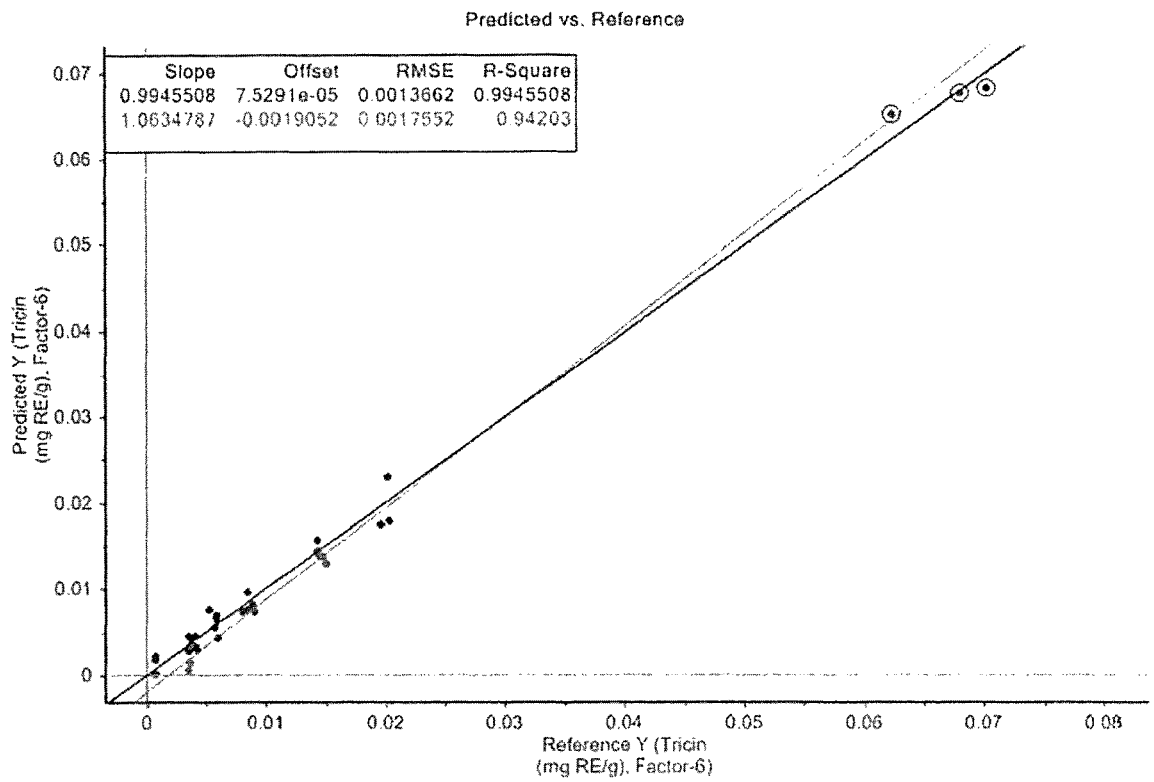
FIG. 19 is a tricin calibration predicted vs reference plot showing the relationship between the reference data value and the NIR-predicted value.

The scores plots (see FIGS. 8, 12 & 17 are indicative of the distribution of the sample population in two dimensions. In this case, Factor 1 and Factor 2 are plotted against each other and represent 97% and 2% of the (residual) variability in the sample set, respectively. Samples that lie close to each other in the scores plot are considered to be similar and those far apart are different from one another.

The regression coefficients (see FIGS. 9, 13 & 18) are also known as the b-vectors or eigenvectors and represent the equation of the model. Multiplying the X-matrix, which is the spectral data for new samples, by the b-vector produces a matrix of predicted Y-values (analyse of interest, e.g. total phenolics). Comparing the regression coefficient with the scores plot assists in identifying which wavelengths (X-variables) are most responsible for the distribution of the samples in the scores plot. Wavelength regions with high regression coefficients represent variable most responsible for the distributions in the scores plot.

The predicted vs reference plots (see FIGS. 11, 15 & 19) show the relationship between the reference data (wet chemistry or traditional methods) value and the NIR-predicted value for a particular analyte. The blue dots represent samples in the calibration set and the red samples represent samples in the validation set. The black line represents the ideal 1:1 relationship between the reference and predicted values, the blue line is the regression of the predicted values against the reference values for the calibration set and the red line represents the same for the validation dataset. Table 1 illustrates the correlation achieved with the present set up.

TABLE 1

| Model | Calibration | | | | Validation | | | |
|---|---|---|---|---|---|---|---|---|
| | n | SEC | $R^2$ | Factors | n | SEP | Bias | $R^2$ |
| Total phenolics | 27 | 4.1 | 0.99 | 5 | 6 | 2.1 | −1.2 | 0.98 |
| Colour | 27 | 92 | 0.98 | 7 | 6 | 162 | −157 | 0.67 |
| Tricin | 27 | 0.0014 | 0.94 | 4 | 6 | 0.0007 | −0.0019 | 0.86 |

This example demonstrates a statistically significant correlation exists between NIR, colour and polyphenols including tricin. This method is therefore useful for a rapid on-line measuring tool for feed forward and feedback purposes in processing sugar.

As noted above the sensors 408 and 412 can measure any suitable pre or post-treatment sugar composition characteristics. Table 2 below sets out several exemplary sensor configurations that may be used in some embodiments.

TABLE 2

| Example configuration | Sensor 408 | Sensor 412 |
|---|---|---|
| A. | colour | NIR spectra |
| B. | colour | UV-vis |
| C. | colour | colour |
| D. | colour | conductivity |
| E. | NIR spectra | NIR spectra |
| F. | NIR spectra | UV-vis |
| G. | NIR spectra | colour |
| H. | NIR spectra | conductivity |
| I. | UV-vis | NIR spectra |
| J. | UV-vis | UV-vis |
| K. | UV-vis | colour |
| L. | UV-vis | conductivity |
| M. | conductivity | NIR spectra |
| N. | conductivity | UV-vis |
| O. | conductivity | colour |
| P. | conductivity | conductivity |

In an alternative example, the system may include a single sensor arranged so that it is able to determine a characteristic of the pre-treatment sugar composition before treatment in the centrifuge.

Figure 5:
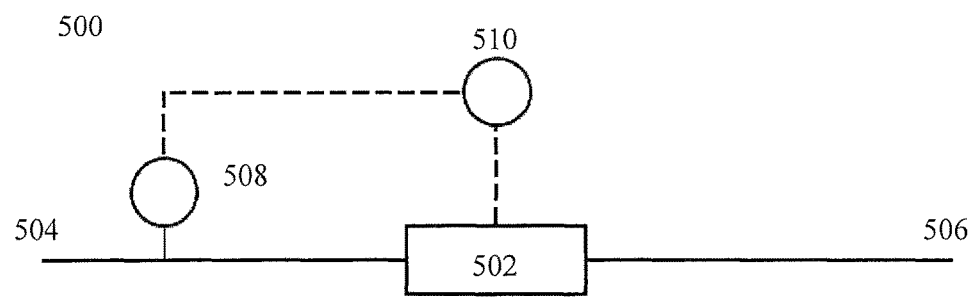

In one such embodiment, illustrated in FIG. 5, the system 500 includes a centrifuge 502 having a pre-treatment sugar composition feed line 504 and an outlet line 506 for off-take of the post-processed sugar product. The feed line 504 includes a sensor 508 for measuring a characteristic of the pre-treatment sugar composition. As with the embodiment of FIG. 4, data from the sensor 508 is fed to a control system 510, and the control system 510 determines an appropriate operating parameter with which to operate the centrifuge 502 in order to obtain a post-treatment sugar product with desired characteristics or a desired profile. This system 500 does not include a sensor on the outlet line 506. Thus, this system 500 is provided with no direct means of quality assessment or quality control. This system 500 may be appropriate in a situation where the control system 510 includes a robust repository of historical data to draw upon, and/or a robust equation for determining the operating parameter of the centrifuge 502.

Figure 6:
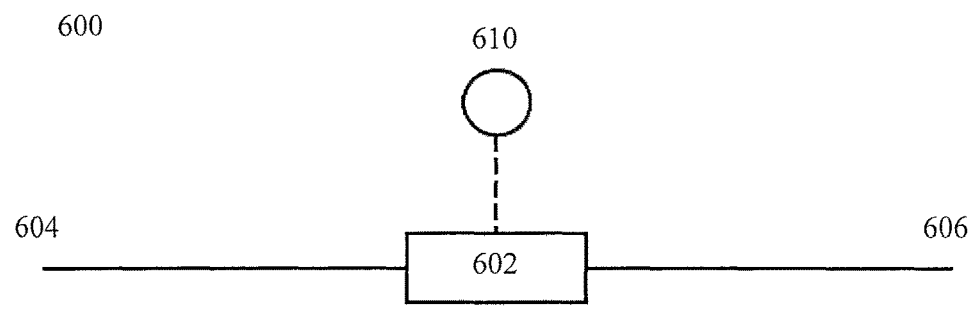

In such a system a further sensor (not shown) can be placed on the outlet line from time to time to test the post-treatment sugar product to thereby test that the correlation being used to determine the operating parameter(s) of the centrifuge is still accurate. Batch testing could also be used for this process In another such embodiment, illustrated in FIG. 6, the system 600 includes a sensor (not shown) located within the centrifuge 602. This sensor may be located underneath the pre-treatment sugar composition on an inlet of the centrifuge 602 as the pre-treatment sugar composition flows into the centrifuge 602. An NIR sensor is suitable for this application. Alternatively the sensor may be placed above the centrifuge 602 to monitor a parameter, such as real time sugar colour, as the sugar composition is being washed. A UV-vis sensor is suitable for this application.

This sensor communicates with the control system 610 to determine an operating parameter for the centrifuge 602. The sensor may be used to determine a characteristic of the pre-treatment sugar composition once the sugar composition is in the centrifuge 602 (rather that from feed line 604) and/or a characteristic of the post-treatment sugar product within the centrifuge 602 after processing (rather than from the outlet line 606). Additionally, the sensor may provide characterisation data during processing of the sugar. Thus, this embodiment also offers the advantage that the sensor may be used to provide real-time sensing and reporting during operation of the centrifuge 606. The control system 610 may use the data provided by the sensor to improve process control in a similar manner to that discussed in the embodiment of FIG. 4.

Figure 7:
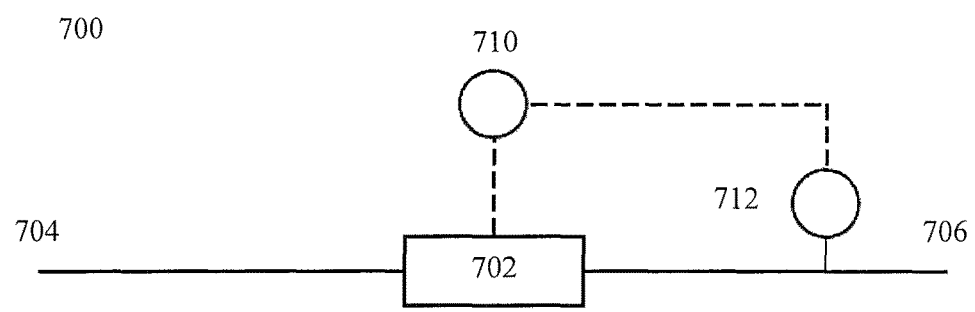

In still another embodiment, illustrated in FIG. 7, the system 700 includes a centrifuge 702 having a pre-treatment sugar composition feed line 704 and an outlet line 706 for off-take of the post-processed sugar product. In this embodiment, the process does not necessarily include a feedforward sensor for providing the first input representative of the pre-treatment sugar composition characteristic to the control system 710. Instead, the control system 710 receives the first input via an alternative route. By way of example, the pre-treatment sugar characteristic may be measured at an off-site location, such as at a facility where the sugar cane or other unrefined feed materials are harvested and potentially subjected to initial processing to form the feed pre-treatment sugar composition of the method of the present invention. In such cases, the pre-treatment sugar characteristic may be measured off-site and transmitted from this off-site location (such as via the internet or other telecommunications network) to the control system 710, such that when the pre-treatment sugar composition is delivered for treatment according to the present invention, the first input has been received by the control system 710.

In a further embodiment, processes according to the present invention are run in parallel. In this case, a large batch of a pre-treatment sugar composition is subdivided into smaller batches. These smaller batches are then processed in different parallel centrifuge process trains. This can occur where there is a stock pile of the pre-treatment sugar composition that is significantly larger than the batch size that can be accommodated by the centrifuges. In this embodiment, a first centrifuge process train has a sensor for measuring a characteristic of the pre-treatment sugar composition (such as sensor 408, 508 in FIGS. 4, 5, or as described in relation to FIG. 6) and other process trains do not include this sensor. Instead, the control systems on these other process trains receive the pre-treatment sugar characteristic from the sensor on the first process train.

Irrespective of the mechanism by which control system 710 receives the pre-treatment sugar characteristic, in this embodiment, once processing in the centrifuge 702 is completed, the post-treatment sugar product passes out of the centrifuge 702. A sensor 712 on the outlet line 706 measures an actual characteristic or profile of the post-treatment sugar product, and relays this information back to the control system 710. The control system 710 can compare the actual characteristics or profile of the post-treatment sugar product against the desired characteristics or profile and optionally perform a number of tasks to improve process control. As discussed in relation to embodiment of FIG. 4, the control system 710 may update the database with the input, desired output, actual output, and centrifuge operating parameter to provide the system with additional historical data upon which to determine a future operating parameter. Alternatively, or additionally, the control system 710 may alter the form of the equation used to determine the operating parameter.

As will be appreciated, a sugar mill may include a plurality of centrifuges. In some embodiments of the present invention all centrifuges can be treated in the same way, and the same operating characteristic used for each. This is less accurate, but requires fewer sensors. However, in other embodiments each centrifuge can be provided with a sensor system to measure at least one characteristic of the pre-treatment sugar composition and a corresponding characteristic of a post-treatment sugar composition. This results in increased accuracy. Such sensors may be those previously described, such as colour, NIR, or UV-vis sensors. In further embodiments, either the input or output sensing could be common to more than one centrifuge, (e.g. use a common input sensor at a mingler/header tank) but the other have (output or input sensing) be performed with dedicated sensor(s) In cases where a centrifuge has dedicated output sensing of its post-treatment sugar product, and its own database (or sub-database) of corresponding operating parameters, the present system is capable of accommodating the idiosyncratic behaviour of each centrifuge to achieve more consistent overall output. The use of dedicated input sensing better enables an embodiment to accommodate batch by batch variations in pre-treatment sugar composition.

Near infra-red spectroscopy has been established as a reliable method for analysing processed sugar cane. This example convincingly demonstrates a statistically significant correlation exists between NIR, colour and polyphenols including tricin. This method is therefore useful for a rapid on-line and/or offline measuring tool for feed forward and feedback QA/QC purposes in making low GI sugars.

As will be appreciated by those skilled in the art sugar refineries or mills may be paid differential rates depending on the specification of sugar produced. For example producing sugar complying with a first specification may attract a different price that sugar produced to a second specification. For example first a specification may be defined by a buyer (e.g. a customer or national sugar board or the like) which sets a target ICUMSA value of less than 1800, for which a first price is paid per tonne, but a second specification may be defined with an ICUMSA value of less than 2500, but attract a lower price. The extent of compliance may also change the price paid for post-processed sugar products, for example producing sugar in batches with properties more tightly grouped around a specification may attract higher prices or bonus payments, e.g. the first specification may pay a bonus for, e.g. every batch of sugar which has an ICUMSA between 1700 and 1800, or for every day of production where the average ICUMSA over all batches lies between 1700 and 1800. The inventor has previously observed that even with such payment processes in place, the ICUMSA values from samples taken over 20 successive days of a production at the same mill can vary by almost 50%. Such production methods thus can be seen as producing sugar with low batch to batch consistency and a wide statistical distribution of sugar characteristics.

Certain embodiments of the present invention seek to provide either a system or a method that is able to be used in a sugar production process to improve batch-to-batch consistency in production, which may assist refiners and millers of sugar to hit such specifications. Such an improvement could in some instances result in a tightening of the statistical distribution of post processed sugar characteristics around a desired target specification. This may allow the refinery or mill to more consistently sell their product for an optimal price, and/or minimise production for a certain post processed sugar product (e.g. by avoiding unnecessary washing etc.) within the specification. Moreover, with some instances of the methods and systems described herein, the possibility to produce specialty sugars defined by a user's target specification could be realised. For example a food manufacturer may require an ingredient which is a sugar product with an average ICUMSA colour within a set band—say 1900-2000, and a certain proportion of the sugar within a broader band—say 60% of the sugar with an ICUMSA of 1750 to 2150. As noted above, specialty sugars could be defined in terms of other measurable physico-chemical properties, e.g. Tricin, polyphenols, conductivity or the like, or some characteristic correlated with these measureable properties.

Tricin-Based Process Control

As noted above, the inventor has found that tricin is able to be detected by NIR, and that measurement of tricin provides a suitable, and possibly better and more direct measurement, than broadly measuring polyphenols. Thus, an additional aspect of the present invention relates broadly to methods of controlling at least an aspect of a sugar production process using tricin concentration as the measured characteristic of the pre- and/or the post-treatment sugar product, or target specification. Systems for performing such methods are also considered to be aspects of the present invention. Thus, in another aspect of the invention, there is provided a method for producing a sugar product including:

receiving an input in the control system representative of a post-treatment sugar product target tricin specification;

receiving at least one input representing a direct or indirect measurement of tricin in either or both of a pre-treatment sugar composition or a post-treatment sugar composition, using the control system to determine at least one operating parameter for a centrifuge and operating the centrifuge in accordance with the at least one determined operating parameter, wherein the at least one determined operating parameter is determined from at least:

the target tricin specification, the input representing a direct or indirect measurement of tricin, and a correlation relating at least the target tricin specification, and the input representing a direct or indirect measurement of tricin to the at least one operating parameter; and treating a pre-treatment sugar composition in the centrifuge to produce a post-treatment sugar product with a characteristic that is at or nearer to the target tricin specification than the pre-treatment sugar composition.

Preferably the input representing a direct or indirect measurement of tricin, is derived from a Near Infrared spectroscopy.

The method can include performing a method according to an embodiment of the first aspect of the present invention which measures tricin. In such embodiments the input in the control system representative of a post-treatment sugar product target tricin specification comprises the second input of the first aspect of the invention, and the input representing a direct or indirect measurement of tricin comprises the first input of the first aspect of the invention.

As will be understood, broadly speaking such embodiments represent a control process using at least partly feed-forward control. However, unlike the first and second aspects of the invention, the present aspect could additionally be performed in a manner that is primarily a feedback control system.

Thus some embodiments can include, receiving at least one input representing a direct or indirect measurement of tricin in a post-treatment sugar composition, using the control system to determine at least one operating parameter for a centrifuge and operating the centrifuge in accordance with the at least one determined operating parameter, wherein the at least one determined operating parameter is determined from at least:

the target tricin specification, input representing a direct or indirect measurement of tricin in a post-treatment sugar composition, and a correlation relating at least the target tricin specification, and the input representing a direct or indirect measurement of tricin in the post-treatment sugar composition, to the at least one operating parameter;

and the method includes, treating a subsequent pre-treatment sugar composition using the determined operating parameter.

As generally discussed above, the control system determines an operating strategy with a view to producing a post-treatment sugar product that has a profile that is consistent with (or approaches) the target specification. As noted above, the operating strategy can be in respect of any parameter associated with operation of the centrifuge.

Another aspect of the present invention provides a system for producing a sugar product including:

at least one centrifuge for treating a pre-treatment sugar composition to produce a post-treatment sugar product;

at least one sensor for determining one or both of a pre-treatment sugar composition characteristic and a post-treatment sugar product characteristic representative of a tricin level; and a control system configured to perform a method in accordance with the immediately previous aspect of the invention.

Figure 20:
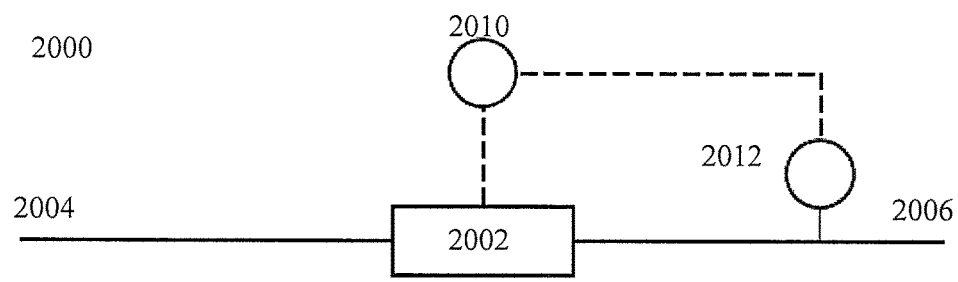
FIG. 20 is schematic block diagram representing a portion of a sugar processing system that implements a feedback system using a tricin measurement to control processing.

As will be understood, broadly speaking the embodiments of the first and second aspects of the present invention described in above, represent a control process using at least partly feed-forward control. Additional details and examples of methods and systems are contained in the detailed description above in connection with FIGS. 1 to 19. However, as noted, tricin based processed control may be additionally performed in a feedback-type system. Accordingly, FIG. 20 is schematic block diagram representing a portion of a sugar processing system that implements a feedback system using a tricin measurement to control processing The system 2000 includes a centrifuge 2002 having a pre-treatment sugar composition feed line 2004 and an outlet line 2006 for off-take of the post-processed sugar product. The process does not include a feedforward sensor for providing an input representative of the pre-treatment sugar composition characteristic to the control system 2010. Instead, the control system 2010 begins processing using a predetermined operating parameter, e.g. a set initial operating parameter, an average historical operating parameter, the last used operating parameter, or an operating parameter determined through some other algorithm or system. Once processing in the centrifuge 2002 is completed, the post-treatment sugar product passes out of the centrifuge 2002. A sensor 2012, in this case an NIR sensor, on the outlet line 2006 measures an actual characteristic or profile of the post-treatment sugar product, and relays this information back to the control system 2010. The control system 2010 can use the NIR data to compare the actual tricin characteristics of the post-treatment sugar product against the desired tricin characteristics and, if needed, perform a number of tasks to improve process control, e.g. change an operating parameter of the centrifuge.

As discussed in relation to previous embodiments, the control system 2010 may update a database with the actual output, and centrifuge operating parameter to provide the system with additional historical data upon which to determine a future operating parameter. Alternatively, or additionally, the control system 2010 may alter the form of the equation used to determine the operating parameter.

Control of Output Quality by Adjusting the Centrifuge Wash Cycle

The following example illustrates the effect of controlling wash time on the ICUMSA and total phenolics of a sugar composition. In this example, ten samples of massecuite were washed according to centrifugal wash processes outlined in Table 3 below to produce a raw sugar.

As can be seen, different wash strategies were employed for different massecuite samples. By way of example, for sample M1, the massecuite was exposed to a first wash at 700 RPM for 2 seconds followed by a second wash at 900 RPM for 2 seconds before being subjected to a final spin at 1100 RPM for 5 seconds. Samples M2 to M10 were similarly subjected to various wash strategies as outlined in Table 3. The purpose of the different first and second wash times for these samples is to build up a model based on the raw sugar results.

TABLE 3

| | Centrifuge Settings | | | | |
|---|---|---|---|---|---|
| Sample ID | 1st wash sec/rpm | 2nd wash sec/rpm | Final spin sec/rpm | Total Wash time (sec) | Av. Colour (ICUMSA) |
| M1 | 2/700 | 2/900 | 5/1100 | 4 | 1852.405 |
| M2 | 2/700 | 2/900 | 5/1100 | 4 | 1725.04 |
| M3 | 1/700 | 1/900 | 5/1100 | 2 | 1801.105 |
| M4 | 3/700 | 3/900 | 5/1100 | 6 | 1251.92 |
| M5 | 2/700 | 2/900 | 5/1100 | 4 | 1217.08 |
| M6 | 1/700 | 1/900 | 5/1100 | 2 | 1769.715 |
| M7 | 3/700 | 3/900 | 5/1100 | 6 | 1150.795 |
| M8 | 2/700 | 1/900 | 5/1100 | 3 | 1369.815 |
| M9 | 2/700 | 0/900 | 5/1100 | 2 | 1387.335 |
| M10 | 1/700 | 0/900 | 5/1100 | 1 | 1414.785 |

Table 4 lists the initial total phenolics of the massecuite and the final total phenolics of the raw sugar for samples M1 to M10.

TABLE 4

| Sample ID | Total phenolics raw sugar (mg CE/100 g) | Total phenolics massecuite (mg CE/100 g) |
|---|---|---|
| M1 | 23.1 | 316.8 |
| M2 | 24.3 | 312.0 |
| M3 | 25.8 | 287.6 |
| M4 | 18.6 | 291.8 |
| M5 | 20.5 | 314.6 |
| M6 | 24.1 | 301.8 |
| M7 | 17.1 | 277.3 |
| M8 | 19.5 | 262.3 |
| M9 | 18.2 | 305.4 |
| M10 | 23.6 | 314.7 |

Figure 21:
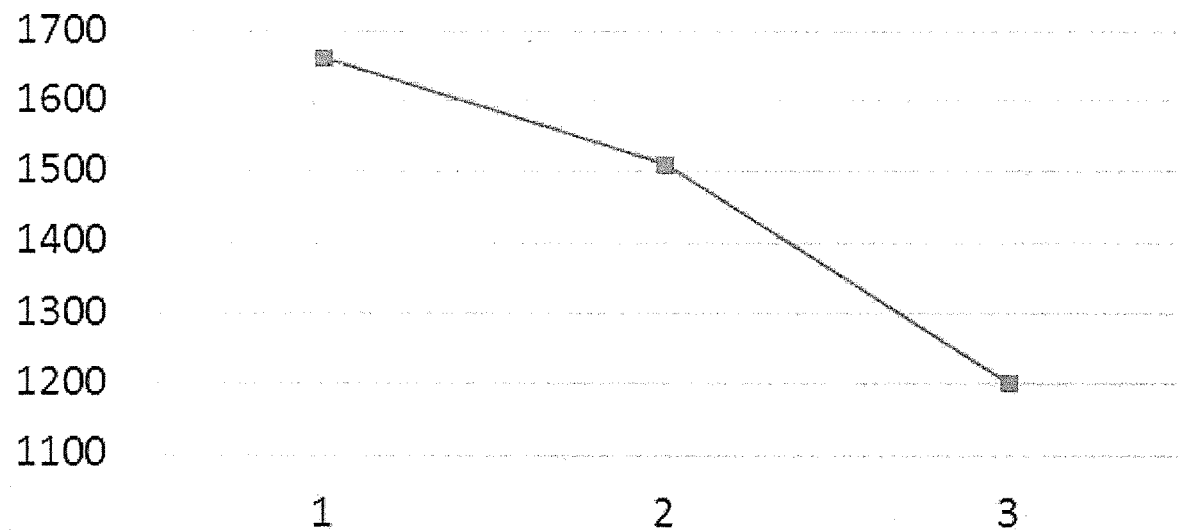
FIG. 21 is a graph showing first wash time vs. ICUMSA.
Figure 22:
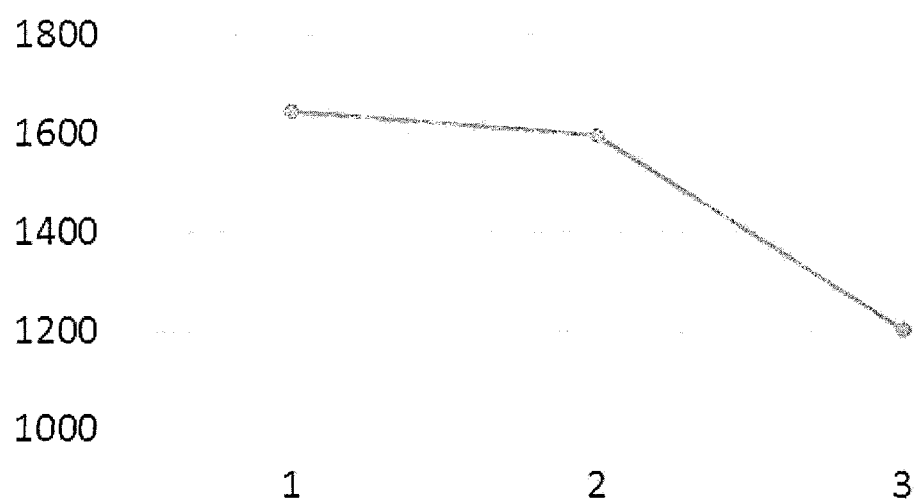
FIG. 22 is a graph showing second wash time vs. ICUMSA.

FIG. 21 is a graph first wash time vs. ICUMSA, and FIG. 22 is a graph showing second wash time vs. ICUMSA. As can be seen from FIGS. 21 and 22, there is a correlation between wash time and the ICUMSA of the raw sugar. This can be used to select appropriate first and second wash times for a particular massecuite to produce a raw sugar having a total phenolics concentration in the desired range. The robustness of the correlation, and thus operation of the centrifuge, can be improved by adding further data sets to the correlation. Thus, during operation, the process can continue to maintain and update the correlation with data sets including wash cycle times and the ICUMSA/total phenolics of the raw sugar.

The methods and systems described herein can be used in the production of a sugar product as described in the Australian Provisional Patent Application No. 2016902954 filed on 27 Jul. 2016 with the title "Sugar composition".

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for producing a sugar product including:
receiving a first input in a control system representative of a pre-treatment sugar composition characteristic;
receiving a second input in the control system representative of a post-treatment sugar product target specification;
using the control system to determine at least one operating parameter for a centrifuge and operating the centrifuge in a centrifugal washing process in accordance with the at least one determined operating parameter, wherein the at least one determined operating parameter is determined from at least:
the first input,
the second input, and
a correlation relating at least the first input and the second input to the at least one operating parameter; and
treating the pre-treatment sugar composition in the centrifuge by a centrifugal washing process to produce a post-treatment sugar product with a characteristic that is at or nearer to the target specification than the characteristic of the pre-treatment sugar composition.

2. The method of claim 1, wherein the correlation is derived from a database of historical first inputs and corresponding historical output characterisation data and associated operating parameter(s).

3. The method of claim 2, wherein after the step of subjecting the pre-treatment sugar composition to the centrifugal washing treatment process, the process further includes:
obtaining corresponding output characterisation data from the post-processed sugar product; and
updating the database with the first input, the corresponding output characterisation data, and the operating parameter(s).

4. The method of claim 1, wherein the pre-treatment sugar composition characteristic is a pre-treatment spectrum, and the post-treatment sugar product target specification is a post-treatment spectrum.

5. The method of claim 4, wherein each spectrum is selected from the group consisting of: a colour spectrum, a near infrared (NIR) spectrum, and a UV-vis spectrum.

6. The method of claim 5, wherein each spectrum is an NIR spectrum.

7. The method of claim 4, wherein each spectrum is indicative of a property selected from the group consisting of: flavonoid types and/or concentrations, phenol types and/or concentrations, polyphenol types and/or concentrations, tannin types and/or concentrations, caramel compound types and/or concentrations, reducing sugar types and/or concentrations, moisture, pol, and grain size.

8. The method of claim 4, wherein each spectrum is indicative of tricin concentration.

9. The method of claim 1, wherein the pre-treatment sugar composition is massecuite.

10. The method of claim 1, wherein the at least one operating parameter includes determining at least one operating parameter selected from the group consisting of: a centrifuge wash time and a centrifuge wash volume.

* * * * *